United States Patent
Kurata et al.

(10) Patent No.: US 11,302,309 B2
(45) Date of Patent: Apr. 12, 2022

(54) ALIGNING SPIKE TIMING OF MODELS FOR MACHING LEARNING

(71) Applicant: INTERNATIONAL BUSINESS MACHINES CORPORATION, Armonk, NY (US)

(72) Inventors: Gakuto Kurata, Tokyo (JP); Kartik Audhkhasi, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 16/570,022

(22) Filed: Sep. 13, 2019

(65) Prior Publication Data

US 2021/0082399 A1 Mar. 18, 2021

(51) Int. Cl.
*G10L 15/06* (2013.01)
*G10L 15/26* (2006.01)
*G10L 15/34* (2013.01)
*G06N 3/04* (2006.01)
*G06N 3/08* (2006.01)
*G10L 15/16* (2006.01)

(52) U.S. Cl.
CPC .......... *G10L 15/063* (2013.01); *G06N 3/049* (2013.01); *G06N 3/0454* (2013.01); *G06N 3/08* (2013.01); *G10L 15/16* (2013.01); *G10L 15/26* (2013.01); *G10L 15/34* (2013.01)

(58) Field of Classification Search
CPC ....... G10L 15/063; G10L 15/26; G10L 15/34; G10L 15/16; G06N 3/0454; G06N 3/08; G06N 3/049
See application file for complete search history.

(56) References Cited

U.S. PATENT DOCUMENTS

| 10,229,672 B1* | 3/2019 | Rao ........................ G10L 15/16 |
| 2017/0011738 A1* | 1/2017 | Senior .................. G10L 15/063 |

(Continued)

FOREIGN PATENT DOCUMENTS

WO 2018051841 A1 3/2018

OTHER PUBLICATIONS

Audhkhasi, Kartik, et al., "Building competitive direct acoustics-to-word models for english conversational speech recognition," 2018 IEEE International Conference on Acoustics, Speech and Signal Processing (ICASSP). IEEE, Apr. 2018, pp. 4759-4763.

(Continued)

*Primary Examiner* — Michael N Opsasnick
(74) *Attorney, Agent, or Firm* — Tutunjian & Bitetto, P.C.; Randall Bluestone

(57) ABSTRACT

A technique for aligning spike timing of models is disclosed. A first model having a first architecture trained with a set of training samples is generated. Each training sample includes an input sequence of observations and an output sequence of symbols having different length from the input sequence. Then, one or more second models are trained with the trained first model by minimizing a guide loss jointly with a normal loss for each second model and a sequence recognition task is performed using the one or more second models. The guide loss evaluates dissimilarity in spike timing between the trained first model and each second model being trained.

20 Claims, 10 Drawing Sheets

(56) References Cited

U.S. PATENT DOCUMENTS

| | | | | |
|---|---|---|---|---|
| 2017/0148431 | A1* | 5/2017 | Catanzaro | G10L 25/18 |
| 2017/0358293 | A1* | 12/2017 | Chua | G10L 15/063 |
| 2018/0247643 | A1* | 8/2018 | Battenberg | G10L 15/02 |
| 2018/0330718 | A1 | 11/2018 | Hori et al. | |
| 2019/0051290 | A1 | 2/2019 | Li et al. | |
| 2020/0175962 | A1* | 6/2020 | Thomson | G10L 15/183 |
| 2021/0005184 | A1* | 1/2021 | Rao | G10L 15/187 |

OTHER PUBLICATIONS

Kurata, Gakuto, et al., "Guiding CTC Posterior Spike Timings for Improved Posterior Fusion and Knowledge Distillation," arXiv preprint arXiv, Apr. 2019, 5 pages, 1904, 08311.

Sanabria, Ramon, et al., "Hierarchical multitask learning with CTC," 2018 IEEE Spoken Language Technology Workshop (SLT), IEEE, Dec. 2018, pp. 485-490.

* cited by examiner

ALIGNING SPIKE TIMING OF MODELS FOR MACHING LEARNING

STATEMENT REGARDING PRIOR DISCLOSURES BY THE INVENTOR OR A JOINT INVENTOR

A "Grace period of ofdisclosure" was made public on Apr. 17, 2019, less than one year before the filing date of the present U.S. patent application. The publication was entitled "Guiding CTC Posterior Spike Timings for Improved Posterior Fusion and Knowledge Distillation" and the joint authors of this publication were Gakuto Kurata and Kartik Audhkhasi, who are also named as joint-inventors of the invention described and claimed in the present patent U.S. application. This publication was published at the web site of arXiv.org (https://arxiv.org/) that is owned and operated by Cornell University on Apr. 17, 2019.

BACKGROUND

The present disclosure, generally, relates to machine learning, and more particularly, to a technique for aligning spike timing of models.

The conventional training pipeline for GMM (Gaussian Mixture Model)/HMM (Hidden Markov Model) systems and DNN (Deep Neural Network)/HMM hybrid systems require output symbols for every input acoustic frame, that is, frame-level alignment, which makes the training process complex and time-consuming. One advantage of training speech recognition models with frame-level alignments is that frame-level posterior fusion of multiple systems is easy.

An end-to-end (E2E) automatic speech recognition (ASR) system using the CTC (Connectionist Temporal Classification) loss function has been gathering interest since it significantly simplifies model training pipelines due to alignment-free nature. The CTC loss function is used for processing a sequence where a neural network such as RNNs (Recurrent Neural Networks), LSTM (Long Short-Term Memory) networks, CNNs (Convolutional Neural Networks), VGG (Visual Geometry Group) and any combination thereof are used. The CTC model emits spiky posterior distributions where most frames emit garbage blank symbols with high probability and a few frames emit target symbols of interest.

SUMMARY

According to an embodiment of the present invention there is provided a computer-implemented method for aligning spike timing of models. The method includes generating a first model having a first architecture trained with a set of training samples, each of which includes an input sequence of observations and an output sequence of symbols having different length from the input sequence. The method also includes training one or more second models with the trained first model by minimizing a guide loss jointly with a normal loss for each second model, in which the guide loss evaluates a dissimilarity in spike timing between the trained first model and each second model being trained. Additionally, the method includes performing a sequence recognition task using the one or more second models.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Now, the present invention will be described using particular embodiments, and the embodiments described hereafter are understood to be only referred to as examples and are not intended to limit the scope of the present invention.

One or more embodiments according to the present invention are directed to computer-implemented methods, computer systems and computer program products for aligning spike timing of models, in which one or more models are trained under guidance of a guiding model having a first architecture by minimizing, jointly with a normal loss, a guide loss evaluating dissimilarity in spike timing between the guiding model and each model being trained.

Hereinafter, first referring to FIGS. 1-4, a computer system for training models with its spike timing being aligned under guidance of a guiding model according to an exemplary embodiment of the present invention, in which the models to be trained are CTC (Connectionist Temporal Classification) models for speech recognition, will be described. Then, referring to FIG. 5 and FIG. 6, a computer-implemented method for training models with its spike timing being aligned under guidance of a guiding model according to an exemplary embodiment of the present invention, in which the models to be trained are CTC models for speech recognition, will be described. Then, experimental studies on novel guided CTC training for speech recognition according to the exemplary embodiment of the present invention will be described with reference to FIGS. 7-9. Finally, referring to FIG. 10, a hardware configuration of a computer system according to one or more embodiments of the present invention will be described.

Figure 1:
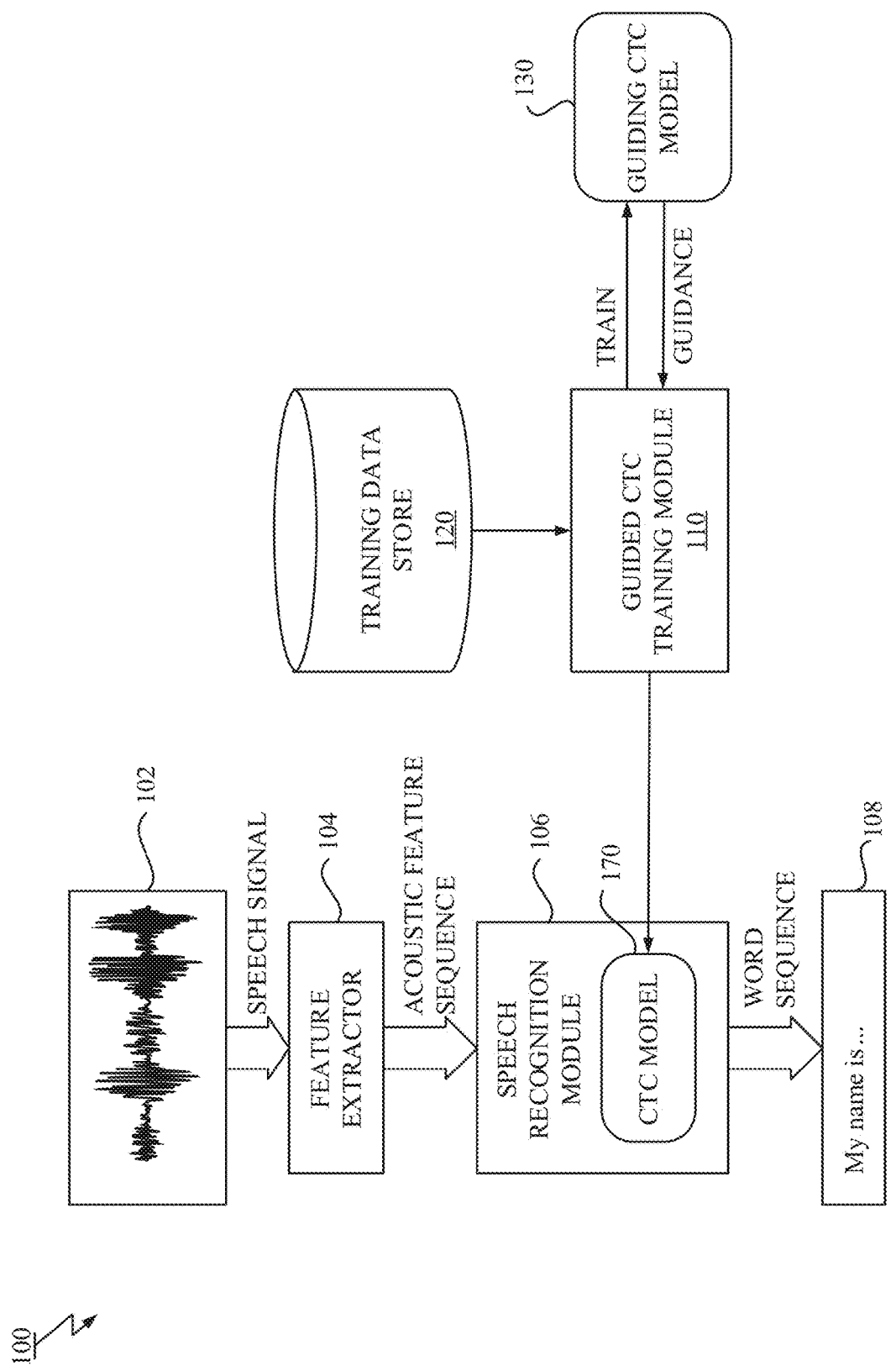
FIG. 1 illustrates a block diagram of a speech recognition system including a guided CTC (Connectionist Temporal Classification) training module for training a CTC model for speech recognition according to an exemplary embodiment of the present invention.

Referring to FIG. 1, a block diagram of a speech recognition system 100 including a guided CTC training module 110 according to an exemplary embodiment of the present invention is described.

As shown in FIG. 1, the speech recognition system 100 may include a feature extractor 104 for extracting acoustic features from an input, and a speech recognition module 106 for performing speech recognition for the input. The speech recognition system 100 according to the exemplary embodiment of the present invention further includes the guided CTC training module 110 for performing novel guided CTC training to obtain/generate a CTC model 170 that is included in the speech recognition module 106. In the embodiment, speech recognition system 100 also includes a training data store 120 for storing a collection of training data used for the novel guided CTC training performed by the guided CTC training module 110.

The feature extractor 104 can receive, as an input, audio signal data 102 digitalized by sampling audio signal, which can be input from a microphone for instance, at a predetermined sampling frequency and a predetermined bit depth. The feature extractor 104 can also receive the audio signal data 102 from a remote client device through a network such as the internet. The feature extractor 104 is configured to extract acoustic features from the received audio signal data 102 by any known acoustic feature analysis to generate a sequence of extracted acoustic features.

The acoustic features can include, but are not limited to, MFCC (Mel Frequency Cepstral Coefficient), LPC (Linear Predictive Coding) Coefficient, PLP (Perceptual Liner Prediction) Cepstral Coefficient, log Mel spectrum, or any combinations thereof. The acoustic features may further include dynamic acoustic features such as delta features and delta-delta features of the aforementioned (static) acoustic features.

Note that elements of the acoustic feature sequence are referred to as "frames" while the audio signal data 102 includes a series of sampled values of the audio signal. Generally, in an exemplary embodiment, the audio signal data 102 is sampled at 8,000 Hz for narrowband audio and 16,000 Hz for broadband audio. The time duration of each frame in the acoustic feature sequence may be approximately 10~40 msec.

The speech recognition module 106 is configured to convert the input sequence of the extracted acoustic features into an output sequence of words. The speech recognition module 106 predicts most plausible speech contents for the input sequence of the extracted acoustic features using the CTC model 170 and outputs a result 108.

The speech recognition module 106 according to the exemplary embodiment of the present invention uses the CTC model and may be an end-to-end model. The speech recognition module 106 may be a sub-word (e.g., phone, character) unit end-to-end model or a word unit end-to-end model. Examples of the unit of the end-to-end model may further include context-dependent-phones such as triphones and a quinphones, and word-pieces, etc. The speech recognition module 106 includes at least the CTC model 170. The CTC model 170 is a target of a novel guided CTC training performed by the guided CTC training module 110. The CTC model 170 is defined as a model trained by using a CTC loss function and is not limited in its architecture.

When the speech recognition module 106 is configured with the sub-word (e.g., phone) unit end-to-end model, the speech recognition module 106 includes an appropriate language model such as an n-gram model and a neural network-based model (e.g., RNN (Recurrent Neural Network)) and dictionary in addition to the CTC model 170. When the speech recognition module 106 is configured with the word unit end-to-end model, the speech recognition module 106 only includes the CTC model 170, and the language model and the dictionary are not required. Also, the speech recognition module 106 can complete speech recognition using just the neural network and does not require complex speech recognition decoders. However, in other embodiments, a language model may be further applied to the result of the word unit end-to-end model in order to improve accuracy of the speech recognition. Also, in the described embodiment, the speech recognition module 106 receives the input sequence of the acoustic features. However, in other embodiments, a raw waveform of the audio signal data 102 may also be received by the speech recognition module 106.

The speech recognition module 106 finds a word sequence with maximum likelihood based on the input sequence of the acoustic features, and outputs the word sequence as the result 108.

The guided CTC training module 110 is configured to perform the novel guided CTC training to obtain/generate the CTC model 170 that is included in the speech recognition module 106.

The described embodiment includes the training data store 120 that stores the collection of the training data, each of which includes speech data and a corresponding transcription. Note that the speech data stored in the training data store 120 may be given in a form of a sequence of acoustic features after feature extraction that may be the same as that performed by the feature extractor 104 in a frontend process for inference. If the speech data is given in a form of audio signal data that is the same as the audio signal data 102 for the inference, the speech data may be subjected to the feature extraction before the training. Also, the transcription can be given in a form of a sequence of phones, context dependent phones, characters, word-pieces or words depending on the unit that the CTC model 170 is targeting.

In the described embodiment, the training data is given as an input-output pair of the an input sequence of observations and an output sequence of symbols where the observations are the acoustic features and the symbols are the phones or words. The training data may be stored in an internal or external storage device operatively coupled to processing circuitry.

The guided CTC training module 110 according to the exemplary embodiment of the present invention first trains a CTC model and then further trains one or more additional CTC models under the guidance of the pre-trained CTC model to obtain/generate the CTC model 170 used for the speech recognition. Note that the CTC model that has been trained in advance and is used for the guidance is called a guiding CTC model 130.

Note that the conventional GMM/HMM or DNN/HMM hybrid system training requires a frame-level alignment and requires the length of the output sequence to be equal to the length of the input sequence. This frame-level alignment may be achieved generally by forced alignment technique. However, this frame-level alignment makes the training process complex and time-consuming. On the other hand, in the described embodiment, the output sequence of the phones or words required for training may have a different length from the input sequence of the acoustic features. Generally, the length of the input sequence of the acoustic features is much longer than the output sequence of the phones or words. That is, no frame-level alignment is required.

Figure 2:
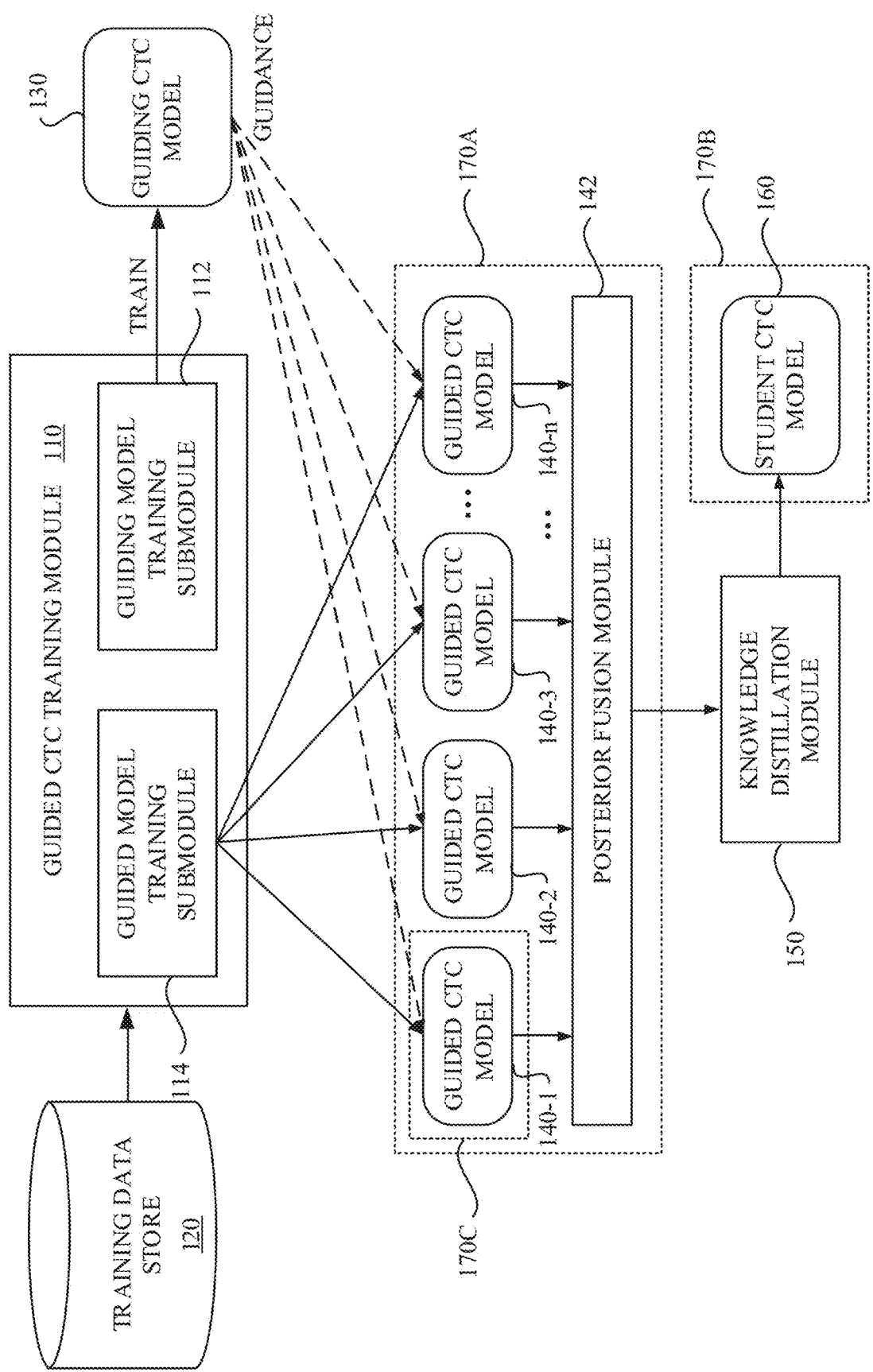
FIG. 2 shows a detailed block diagram of the guided CTC training module and ways of obtaining/generating a trained CTC model used for the speech recognition according to one or more particular embodiments of the present invention.

Referring to FIG. 2, a detailed block diagram of the guided CTC training module 110 is described. In FIG. 2, ways of obtaining/generating a trained CTC model 170 used for the speech recognition are also described.

As shown in FIG. 2, the guided CTC training module 110 can include a guiding model training submodule 112 for obtaining/generating the guiding CTC model 130, and a guided model training submodule 114 for training one or more CTC models under the guidance of the guiding CTC model 130. Note that the CTC model that has been trained under the guidance of the guiding CTC model 130 is called a guided CTC model 140.

The guiding model training submodule 112 is configured to train a CTC model having an architecture with a set of training data in the training data store 120 to obtain/generate the guiding CTC model 130. The guided model training submodule 114 is configured to train one or more CTC models having respective architectures with respective sets of training data in the training data store 120 under the guidance of the guiding CTC model 130 to generate the guided CTC models 140-1~140-n.

Note that the architectures of the CTC models 130, 140 that are targets of the CTC training can be RNN type models, which includes a basic RNN, LSTM (Long Short-Term Memory), Elman network, Jordan network, Hopfield network, etc. Also, the RNN type models can include more complex architectures such as any one of the aforementioned RNN type models used in combination with other architecture such as CNN (Convolutional Neural Network), VGG. Also, the architecture of the CTC models 130, 140 may be unidirectional where the network gets information from just a past state or bidirectional where the network gets information from past and future states simultaneously. In yet other embodiments, other architectures such as CNNs and VGG and any combination of aforementioned architectures are also contemplated.

The architecture for the guiding CTC model 130 matches a target architecture of the CTC model 170 that is finally required to be obtained. The target architecture of the CTC model 170 may depend on constraints of the ASR system to be deployed. For example, the unidirectional model can be used for online speech recognition, which is more difficult with bidirectional models.

In a particular embodiment, the architecture of the guiding CTC model 130 is the same as those of the guided CTC models 140-1~140-n. However, in other particular embodiments, the guiding CTC model 130 may have an architecture different from those of the guided CTC models 140-1~140-n as long as the set of the output symbols is the same. Even if the architectures of the guiding CTC model 130 and the guided CTC models 140-1~140-n are the same, specific configurations of the neural network such as the number of hidden layers in the neural network and the number of units in each layer may be the same or different from each other. Thus, the size and/or complexity of the guiding CTC model 130 may be different from the guided CTC models 140-1~140-n. In a particular embodiment, the guiding CTC model 130 is configured to be more lightweight and more compact than the guided CTC models 140-1~140-n. Additional time and/or computational cost, which may be added due to the training of the guiding CTC model 130, can be reduced by reducing the size and/or complexity of the guiding CTC model 130.

Further, note that within the guided CTC models 140-1~140-n, each guided CTC model 140 can have the same architecture as, or can have an architecture at least partially different from, the other guided CTC model 140.

In a particular embodiment, both of the guiding CTC model 130 and the guided CTC models 140-1~140-n have architectures of unidirectional RNN type models. In other particular embodiments, both of the guiding CTC model 130 and the guided CTC models 140-1~140-n have architectures of bidirectional RNN type models. In a preferable embodiment, the architecture of the guiding CTC model 130 is the unidirectional RNN type model and the architectures of the guided CTC models 140-1~140-n are the bidirectional RNN type models.

Also note that the guiding CTC model 130 and the guided CTC models 140-1~140-n are trained with the same set of the training data. However, the set of the training data used for training the guiding CTC model 130 is different from the sets of the training data used for training the guided CTC models 140-1~140-n. In a particular embodiment, the set of the training data for the guiding CTC model 130 may be of a lesser amount than that for the guided CTC models 140-1~140-n. Additional time and/or computational cost, which may be added due to the training of the guiding CTC model 130, can be reduced by reducing the amount of the training data for the guiding CTC model 130.

Further note that within the guided CTC models 140-1~140-n, the set of the training data used for training one guided CTC model 140 may be the same as or different from the set of the training data used for other guided CTC model 140.

Figure 3:
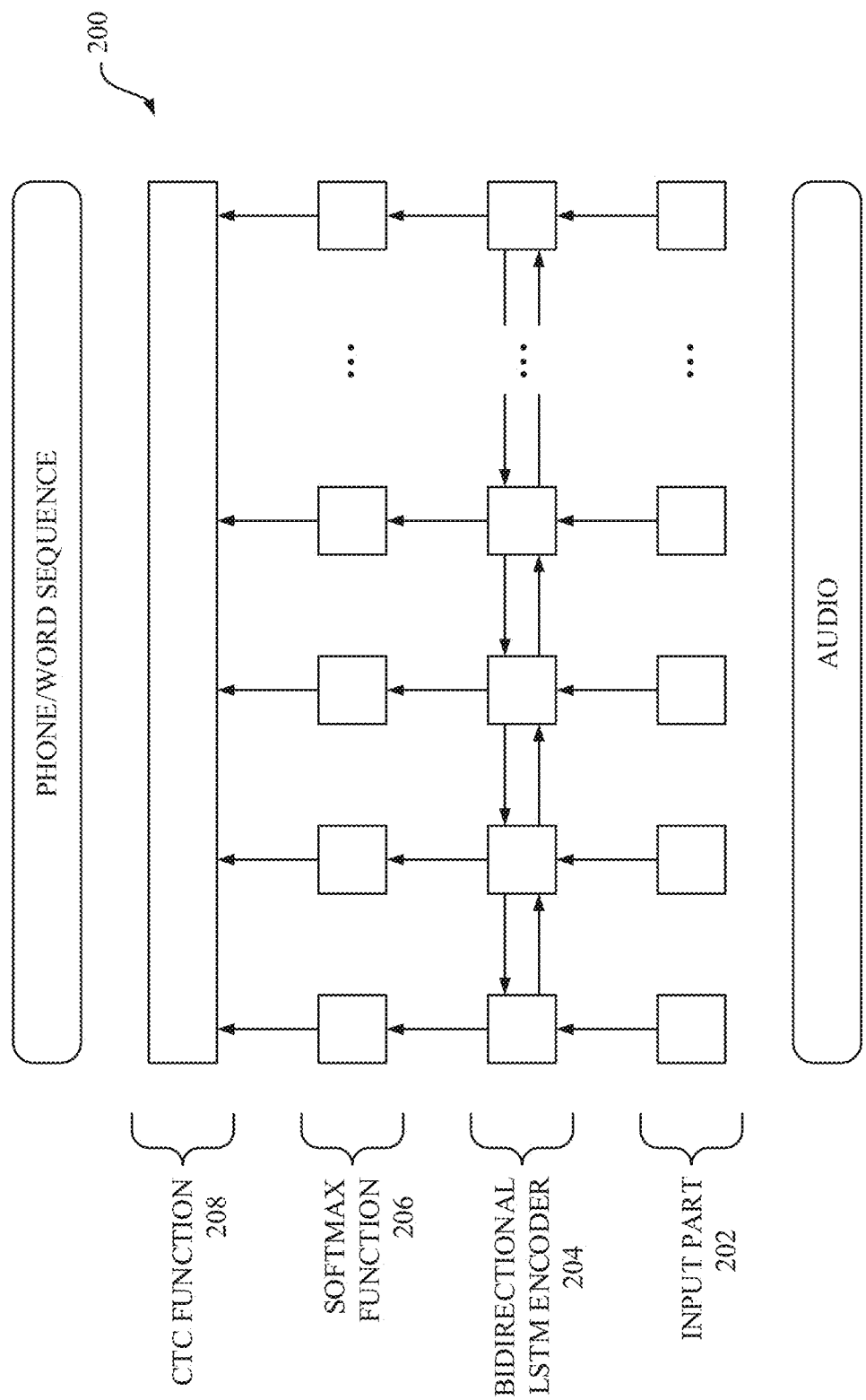
FIG. 3 shows a schematic of training of a bidirectional LSTM CTC model as an example of a CTC model according to the embodiment of the present invention.

With reference to FIG. 3, a schematic of training of a bidirectional LSTM CTC model is shown as an example of the CTC model. For training the CTC model, pairs of phone/word sequences and audio signal data without alignment are fed. The bidirectional LSTM CTC model 200 includes an input part 202 for receiving an input sequence of acoustic features that are obtained from the given audio signal data via the feature extraction, a bidirectional LSTM encoder 204, a softmax function 206, and a CTC loss function 208.

As an input for the CTC model, frame stacking, in which successive frames are stacked together as a super frame, are also contemplated.

The bidirectional LSTM encoder 204 transforms the input sequence of the acoustic features into high level features. The softmax function 206 computes a probability distribution based on the output of high-level features obtained from the bidirectional LSTM encoder 204 by normalization.

The CTC loss function 208 is a specific type of a loss function designed for the sequence labeling tasks. Let y denote a sequence of target output symbols having a length of L. Let X denote a sequence of acoustic feature vectors over T time steps. While the conventional alignment-based DNN/HMM hybrid system training requires L to be equal to T, the CTC introduces an extra blank symbol φ that expands the length-L sequence y to a set of length-T sequences Φ(y), allowing alignment-free training. Each sequence in the set of length-T sequences yˆ (yˆ is an element of Φ(y)), is one of the CTC alignments between the sequence of the acoustic feature vectors X and the sequence of the target output symbols y. For example, let us assume that a given output phone sequence is 'ABC' and the length of the input sequence is 4. In this case, possible phone sequences would be {AABC, ABBC, ABCC, ABC_, AB_C, A_BC, _ABC} where '_' denotes the blank symbol (φ). The CTC loss is defined as the summation of the symbol posterior probabilities over all possible CTC alignments as follows:

$$L_{CTC} = -\sum_{y^\wedge \in \phi(y)} P(y^\wedge \mid X).$$

The CTC training maximizes the summation of the possible output sequences or minimizes the negative of the summation while allowing blank outputs for any frame probabilities. The guiding model training submodule 112 trains a CTC model having a target architecture to obtain the guiding CTC model 130 by minimizing the CTC Loss $L_{CTC}$.

The CTC model emits spiky and sparse posterior distributions over target output symbols where most frames emit blank symbols φ with high probability and a few frames emit target output symbols of interest. Spike timing that the trained CTC model emits is not controlled. Note that the symbol having the highest posterior probability except for at least the blank symbol at each time index is called as a 'spike' herein. Whether the spikes contain a silence or not depends on a way of thinking. In the described embodiment, a symbol having the highest posterior probability except for the blank and the silence is called a 'spike'. In other embodiments, the symbol (including the silence) having the highest posterior probability except for the blank is called a 'spike' since the silence symbol could also process a particular background noise. Note that the symbol that is not treated as a 'spike' is called a 'non-spike' symbol. As a result, the CTC models trained by minimizing the aforementioned normal CTC loss $L_CTC$ may have different spike timings even though all models have been trained with the same data since labels are not assigned to each frame but to whole utterance, which poses a new set of challenges especially in posterior fusion from multiple CTC models and knowledge distillation between CTC models.

As demonstrated in the experimental results described later, spike timings are not aligned with the normal CTC training even when the CTC models having the same architecture are employed. Spike timings are completely different when the word CTC models are employed, which emit more sparse posterior distributions than the phone CTC models. Spike timings are completely different between the CTC model having different architectures such as a combination of unidirectional and bidirectional models.

Note that the posterior fusion is a technique that combines posterior probabilities at the same time index from multiple models. The knowledge distillation is a technique that distills knowledge of a teacher model, which may be a single model or an ensemble of a plurality of models, and transfers the knowledge distilled from the teacher model into a student model. The knowledge distillation is also called teacher-student training. The posterior fusion improves speech recognition accuracy and the knowledge distillation makes the student model better if posterior distributions from multiple models are aligned. The traditional NN-hybrid and GMM-hybrid systems satisfy this assumption of aligned posteriors since labels are assigned to each frame.

However, due to non-aligned spike timings of the CTC models, the posterior fusion generally does not make better posterior distributions by computing an average or a weighted-average across multiple CTC models. Hence, it is difficult to improve the accuracy by a naive posterior fusion, and also to use the (weighted-) average of the posterior distributions as a teacher model to train the student model via the knowledge distillation.

So the guided model training submodule 114 according to the exemplary embodiment of the present invention is configured to guide spike timings of CTC models for the propose of the posterior fusion and/or the knowledge distillation. In order to guide the spike timings of the CTC models, after the training of the guiding CTC model 130 is complete, the guided model training submodule 114 further trains one or more other CTC models by forcing its spikes to occur at the same timing with that from the guiding CTC model 130 trained in advance by minimizing an additional loss jointly with the aforementioned normal CTC Loss $L_{CTC}$. The additional loss is minimized jointly with the aforementioned normal CTC Loss $L_{CTC}$ so that similar spike timings to that of the guiding CTC model 130 is obtained/generated for the CTC model being trained. Note that minimizing a loss (the normal CTC loss and the additional loss) includes maximizing the negative of the loss, which may be called a reward, a profit utility, or a fitness.

Figure 4:
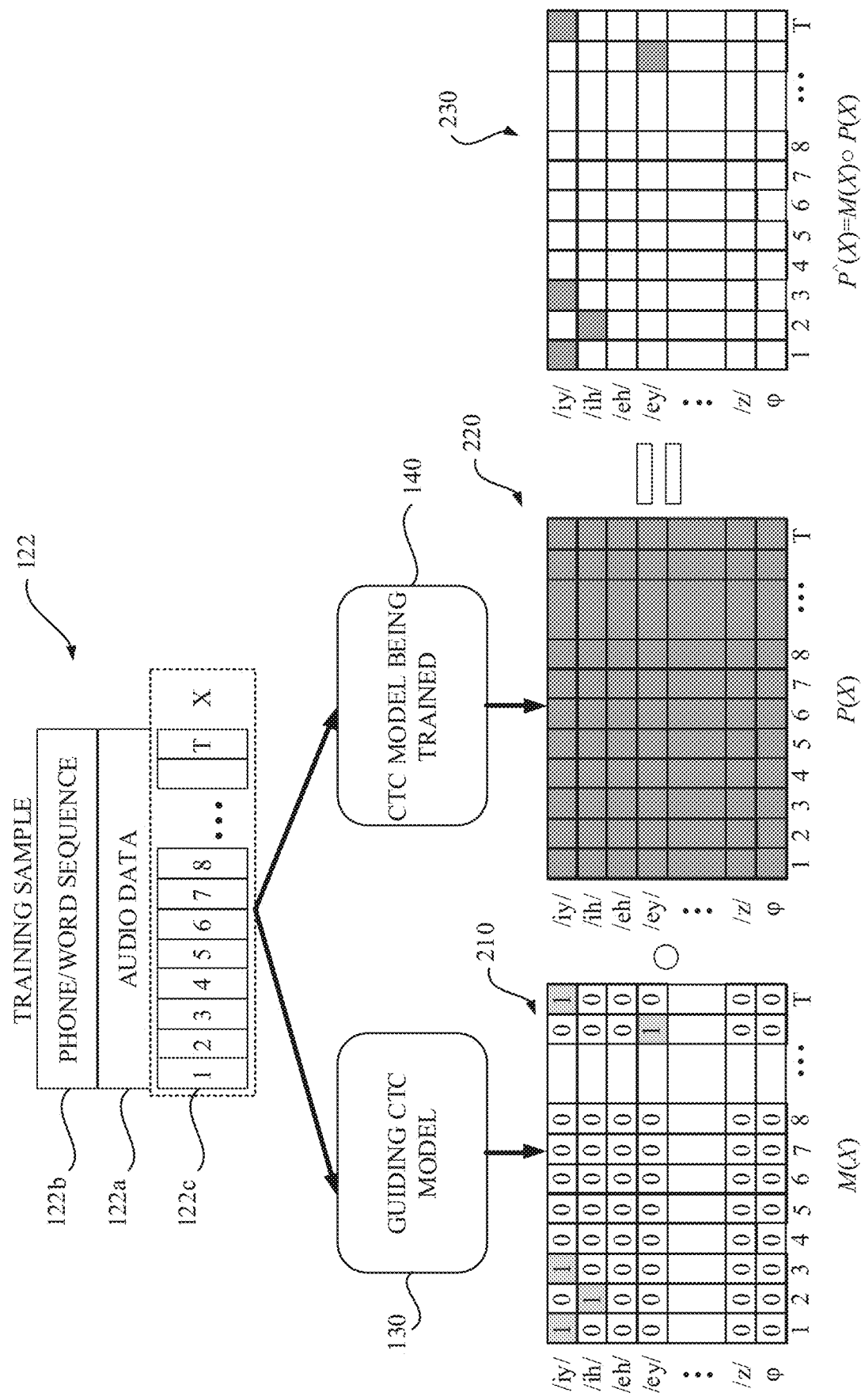
FIG. 4 describes a guide loss used jointly with a normal CTC loss during guided CTC training according to the exemplary embodiment of the present invention.

Referring to FIG. 4, an additional loss (that is referred to as a 'guide loss' herein) used jointly with the normal CTC loss during the guided CTC training is described. FIG. 4 shows a schematic diagram on how to guide the spike timings of each guided CTC model 140 by using the guiding CTC model 130, assuming that the training of the guiding CTC model 130 is complete in advance.

When training the CTC models 140, for each training data 122 including an input sequence of acoustic features 122c of T time steps, first, the guided model training submodule 114 feeds the input sequence of acoustic features 122c as a training sample X into the guiding CTC model 130, does the forward pass, and obtains a sequence of posterior distributions.

The guided model training submodule 114 then prepares a mask 210 (M(X)) based on the output sequence of the posterior distributions obtained from the guiding CTC model 130. The guided model training submodule 114 converts the output sequence of the posterior distributions into the mask 210(M(X)) by setting '1' at the output symbol with the highest posterior probability and '0' at other symbols at each time index (i). In a particular embodiment, in the cases where the non-spike symbol (e.g. the blank symbol φ and optionally the silence symbol) has the highest posterior probability, '0' is set for all symbols at this time index (i).

In the described embodiment shown in FIG. 4, the mask is represented as a two-dimensional array or matrix where rows denote output symbols (phones and blank in the case of FIG. 4) and columns denote time indices. Each element of the mask 210 (M(X)) holds a value representing whether to pass (1) or not pass (0) an output value for a corresponding output symbol designated by the row and a corresponding time index designated by the column. The obtained mask is configured to pass an output value of an output symbol corresponding to a spike emitted from the guiding CTC model 130 at each time index (i).

Then, the guided model training submodule 114 feeds the same training sample X to each CTC model 140 being trained, does the forward pass, and obtains a sequence of posterior distributions 220 (P(X)) for each CTC model 140 being trained.

The guided model training submodule 114 applies the mask 210 (P(X)) to the output sequence of the posterior distributions 220 (P(X)) obtained for the same input training sample X from each CTC model being trained to obtain masked posterior distributions 230 (P^(X)).

More specifically, the masked posterior distributions are calculated by a Hadamard product (element-wise product) of the mask M (X) and the sequence of the posterior distributions P(X), P^(X)=M(X)·P(X). The masked posterior distributions P^(X) give the guide loss at least partially (e.g., at least partially determining the guide loss). In the described embodiment, the guide loss $L_G$ is defined as the negative of the summation of the masked posterior distributions P^(X) as follows:

$$L_G = -1 \cdot \Sigma P^{\char`\^}(X).$$

The summation of the masked posterior distributions P^(X) becomes greater if the CTC model 140 being trained has spikes for the same output symbol at the same times as the guiding CTC model 130. Thus, by maximizing the summation of the masked posterior distributions P^(X) or minimizing the negative of the summation of the masked posterior distributions P^(X), the spike timings of the CTC model 140 being trained is guided to be the same as those of the guiding CTC model 130.

Note that the logarithmic guide loss is equivalent to a frame-level cross-entropy where the target is the sequence of the output symbols with the highest posterior probability from the guiding model except that the non-spike symbol (the blank symbol and optionally the silence symbol) is ignored. Note that the mask M(X) is derived from this target sequence.

The overall loss for the guided CTC training becomes the summation of the normal CTC loss $L_{CTC}$ and the guide loss $L_G$ as $L=L_{CTC}+L_G$. Based on the overall loss L, parameters of each CTC model 140 being trained are updated through backpropagation each time the training sample or a group of training samples is processed.

Note that, in the described embodiment, the mask is a hard type mask that has the value representing whether to pass (1) or not pass (0) the output value for each output symbol and each time index. In the hard type mask, the values of the output symbols for each time index are determined in a manner depending on a corresponding posterior distribution for each time index in the output of the guiding CTC model 130. However, different types of masks are also be contemplated.

In other embodiment, instead of treating symbols of phones individually, it is possible to handle symbols for all phones comprehensively. Such an alternative hard mask has the value representing whether to pass (1) or not pass (0) the output value at each time index depending on the output symbol having highest probability corresponds to a spike or non-spike.

In yet other embodiments, instead of using the hard type mask (0/1 mask), a soft type mask that has a factor (e.g., an intermediate value between 1 and 0) representing degree of passing an output value for each output symbol and each time index can also be employed. In such a soft type mask, the factors of the output symbols for each time index are determined in a manner depending on a corresponding probability distribution (a set of posterior probabilities) for each time index in the output of the guiding CTC model 130. In a particular embodiment, similarly to the hard type mask, in the cases where the non-spike symbol (the blank symbol and optionally the silence symbol) has the highest posterior, '0' is set for all symbols at this time index (i). In yet other embodiments, the soft type mask may be tuned by changing a temperature of the softmax function when calculating the posterior distribution from the guiding CTC model 130. The hard type mask is equivalent to the soft type mask in the case of low temperature of the softmax function.

The newly added guide loss term evaluates dissimilarity in spike timing between the guiding CTC model 130 and the CTC model 140 being trained and forces the spikes from the CTC model 140 being trained to occur at the same time as those from the guiding CTC model 130. Note that the term 'dissimilarity' is defined as a quality or state of being dissimilar or a quality or state of not being similar and, more specifically, when applied to spike timings, as the difference between the spike timings. By minimizing the guide loss $L_G$ jointly with the normal CTC loss $L_{CTC}$ when training each guided CTC model 140, the CTC spike timings are explicitly guided to be aligned with those from the pre-trained guiding CTC model 130. Hence, the CTC models 140-1~140-n guided by the same guiding CTC model 130 have aligned spike timings.

The advantages of the novel guided CTC training include that the posterior fusion of the multiple CTC models and the knowledge distillation between CTC models with arbitrary neural network architectures become available. Also, the CTC model 140 guided by the guiding CTC model 130 itself may have improved speech recognition accuracy.

Referring back to FIG. 2, there is a posterior fusion module 142 that performs the posterior fusion to combine results originating from different guided CTC models 140-1~140-n. By changing training conditions such as training data order, a seed for parameter initialization and neural network topology, CTC models with the same spike timings but different characteristics can be trained. Since the spike timing of the guided CTC models 140-1~140-n are aligned, better posterior distributions would be obtained by (weighted-) averaging aligned posterior distributions from the guided CTC models 140-1~140-n that share the same guiding CTC model 130. As a result, the accuracy of the speech recognition is improved.

In a particular embodiment, a set of the guided CTC models 140-1~140-n and the posterior fusion module 142 is used as the CTC model 170A for the speech recognition performed by the speech recognition module 106. Note that since each guided CTC model 140 has been guided with the guiding CTC model 130, the output of the guiding CTC model 130 may also be used for the posterior fusion. Thus, the CTC model 170A may include at least two of the one or more guided CTC models 140-1~140-n and the guiding CTC model 130 together with the posterior fusion module 142.

In FIG. 2, there is further a knowledge distillation module 150 that performs the knowledge distillation to train a student CTC model 160 by combining results originating from the different guided CTC models 140-1~140-n. The averaged posteriors of the guided CTC models 140-1~140-n may be used as a teacher model. In one embodiment, the knowledge distillation is performed by minimizing frame-wise KL (Kullback-Leibler) divergence. In another embodiment, the knowledge distillation is performed by minimizing frame-wise cross-entropy. Since the spike timing of the guided CTC models **140-1~140-*n* are aligned, the student CTC model 160 would be successfully trained by distilling knowledge from an ensemble of the guided CTC models 140-1~140-*n* that share the same guiding CTC model 130. In a particular embodiment, the student CTC model 160 is used as the CTC model 170B for the speech recognition. Note that since each guided CTC model 140 has been guided with the guiding CTC model 130, the guiding CTC model 130 may also be used as one of teacher models. Thus, the teacher model may include at least two of the one or more guided CTC models 140-1~140-*n* and the guiding CTC model 130**.

Note that in the knowledge distillation the student CTC model 160 has an architecture matched to the architecture of the guiding CTC model 130.

In a particular embodiment, each of the guiding CTC model 130, the guided CTC models **140-1~140-*n* and the student CTC model 160 have the same architectures. In other particular embodiments, the guiding CTC model 130 has an architecture that is different from the architectures of the guided CTC models 140-1~140-*n* but the same as the student CTC model 160. In a preferable embodiment, the architecture of the guiding CTC model 130 and the student CTC model 160 is a unidirectional and the architecture of the guided CTC models 140-1~140-*n*** used as the teacher model is bidirectional model. Thus, the knowledge distillation between multiple CTC models with arbitrary neural network architectures becomes possible.

The spike timings of CTC models with different neural network architectures may be significantly different, which generally makes the knowledge distillation between such models difficult. A typical case is knowledge distillation from a bidirectional RNN type CTC model to a unidirectional RNN type CTC model. Since the bidirectional model gets information from past and future states simultaneously, the bidirectional model generally has better accuracy than the unidirectional model, but it is difficult to apply to online processing. Thus, it is advantageous to realize successful knowledge distillation from the bidirectional model to the unidirectional model. In contrast to the standard CTC training, according to the novel guided CTC training, by training a teacher model (the one or more guided CTC models 140) using the guiding CTC model 130 that has the same architecture as the final desired student CTC model 160, the trained teacher model (the one or more guided CTC models 140) may have the spike timings appropriate for the student CTC model 160 and may be used in the knowledge distillation.

In FIG. 2, there is further a dotted square 170C surrounding one guided CTC model 140. Since the CTC model 140 guided by the guiding CTC model 130 may have improved accuracy compared to the model without guidance of the guiding model. The guiding CTC model 130 promotes a good alignment path and hence does not allow the CTC training to assign sufficient probabilities to bad alignment paths, which results in an improved accuracy. Thus, one CTC model 140 guided by the guiding CTC model 130 may also be used as the CTC model 170C used for the speech recognition.

In the described embodiment, the posterior fusion is employed as a system combination method. However, other system combination method including ROVER (Recognizer Output Voting Error Reduction) are also contemplated even though the ROVER result may not be suitable as a teacher model for the knowledge distillation. Also note that posterior fusion requires decoding, while ROVER needs multiple separate decodes. This is another advantage of the posterior fusion realized by the novel guided CTC training.

In particular embodiments, each of modules 104, 106, 110 described in FIG. 1, each of submodules 112, 114 of the guided CTC training module 110, the modules 142, 150 described in FIG. 2 and the CTC models 130, 140, 160, 170 may be, but not limited to, implemented as a software module including program instructions and/or data structures in conjunction with hardware components such as a processor, a memory, etc.; as a hardware module including electronic circuitry; or as a combination thereof. These modules 104, 106, 110, 142, 150 and submodule 112, 114 may be implemented on a single computer device such as a personal computer and a server machine or over a plurality of devices in a distributed manner such as a computer cluster of computer devices, client-server system, cloud computing system, edge computing system, etc. The training data store 120 and the stores for parameters of the CTC models 130, 140, 160, 170 may be provided by using any internal or external storage device or medium, to which a processing circuitry of a computer system implementing the guided CTC training module 110 is operatively coupled.

There are several ways of performing the novel CTC training. In a particular embodiment, any or all of the training of the guiding CTC model 130, the training of the guided CTC models 140 and the training of the student CTC model 160 can be conducted at a computing system. In other particular embodiments, the training of the guiding CTC model 130 is conducted at a central computing system and the same guiding CTC model 130 is distributed to a plurality of remote computing systems. Then, the training of each guided CTC model is conducted at each remote computing system using the guiding CTC model 130 provided by the central computing system and a set of own training data. Then, the guided CTC model trained at each remote computing system is collected at the central computing system. Finally, the training of the student CTC model 160 is conducted via the knowledge distillation and the posterior fusion using the guided CTC models that are returned from the remote computing systems. Instead of performing the training of the student CTC model 160 at the central computing system, the training of the student CTC model 160 may be conducted at yet other computing system.

Also in a particular embodiment, the feature extractor 104, the speech recognition module 106 including the CTC model 170 that is trained by the guided CTC training module 110 are implemented on a computer system of a user side while the guided CTC training module 110 are implemented on a computer system of a provider side of a speech recognition system. In a further variant embodiment, only the feature extractor 104 is implemented on the user side and the speech recognition module 106 is implemented on the provider side. In this embodiment, the computer system of the client side merely transmits the sequence of the acoustic features to the computer system of the provider side and receives the decoded result 108 from the provider side. In another variant embodiment, both of the feature extractor 104 and the speech recognition module 106 are implemented on the provider side, and the computer system of the client side merely transmits the audio signal data 102 to the computer system of the provider side and receives the decoded result 108 from the provider side.

Figure 5:
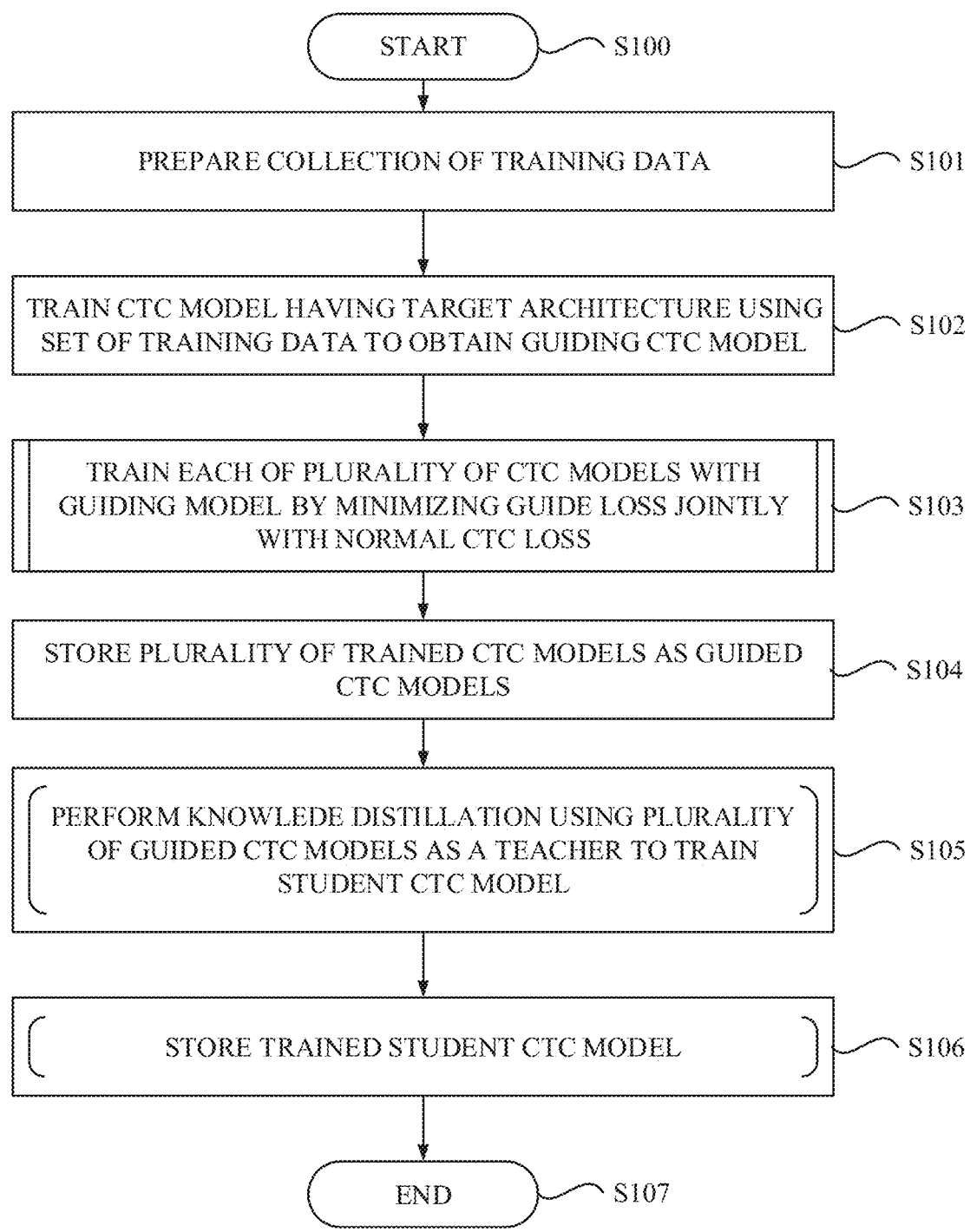
FIG. 5 is a whole flowchart depicting a novel guided CTC training process for obtaining/generating a CTC model used for the speech recognition according to an exemplary embodiment of the present invention.
Figure 6:
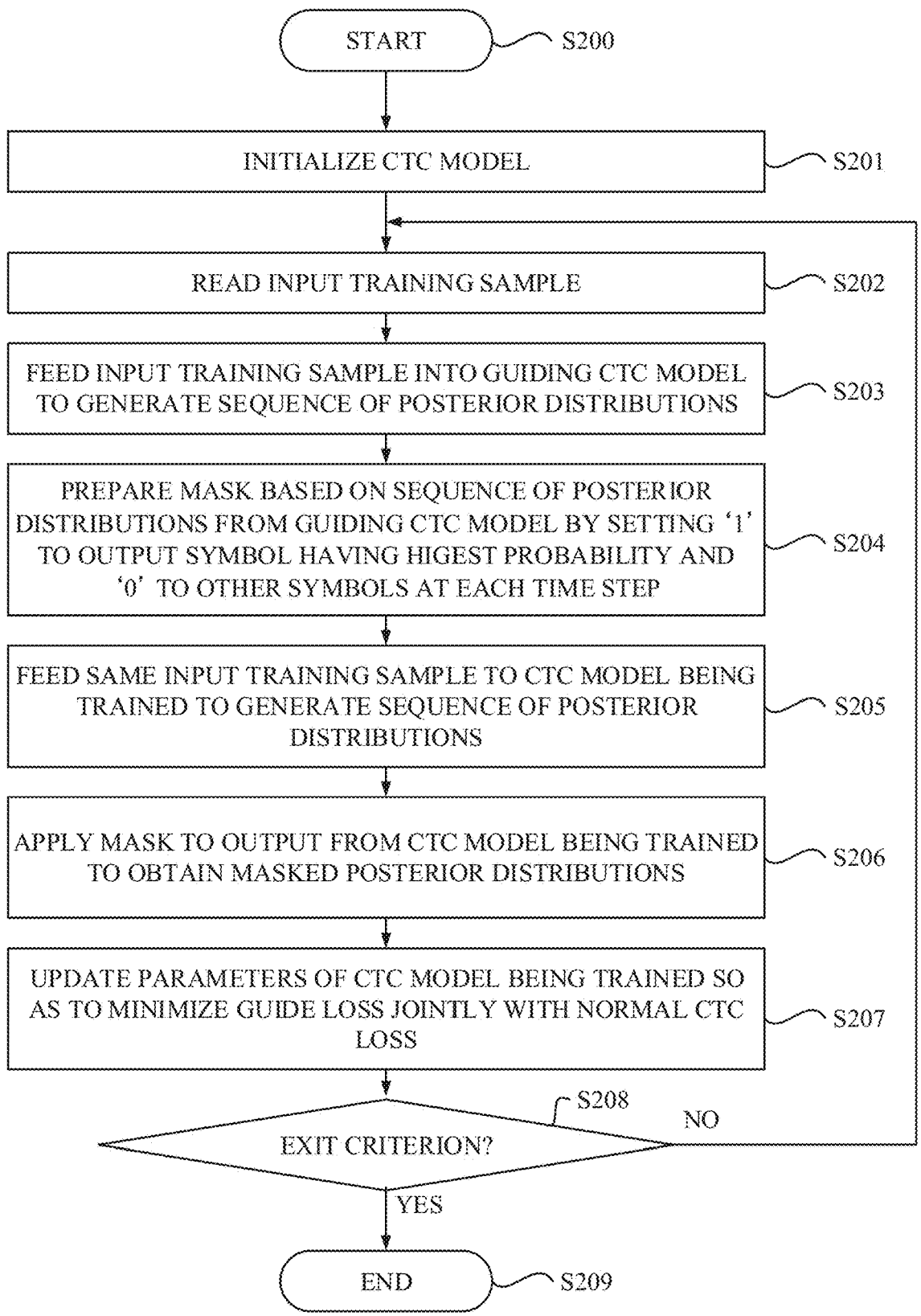
FIG. 6 is a flowchart depicting a process for training a CTC model with a guiding CTC model in the guided CTC training process according to the exemplary embodiment of the present invention.

Hereinafter, referring to FIG. 5 and FIG. 6, a novel guided CTC training process for training a CTC model used for speech recognition according to an exemplary embodiment of the present invention is described. FIG. 5 is a whole flowchart depicting the novel guided CTC training process for obtaining/generating a CTC model used for speech recognition. FIG. 6 is a flowchart depicting a process for training a CTC model with a guiding CTC model in the novel guided CTC training shown in FIG. 5. Note that the process shown in FIG. 5 and FIG. 6 may be performed by processing circuitry such as a processing unit of a computer system that implements the guided CTC training module 110 shown in FIG. 1 and its submodules 112, 114 shown in FIG. 2.

The process shown in FIG. 5 can begin at block S100 in response to receiving a request for the novel guided CTC training from an operator, for example.

At block S101, the processing unit can prepare a collection of training data from the training data store 120. Each training data includes a sequence of feature frames each having a vector of acoustic features and a sequence of symbols such as phones or words.

At block S102, the processing unit can train, by the guiding model training submodule 112, a CTC model having a target architecture using the set of the training data by minimizing a normal CTC loss to obtain/generate the guiding CTC model 130.

At block S103, the processing unit can train, by the guided model training submodule 114, each of a plurality of CTC models with the guiding CTC model 130 trained at block S102 using the set of the training data by minimizing a guide loss $L_G$ jointly with a normal CTC loss $L_{CTC}$, for each CTC model being trained. The processing at block S103 will be described in more detail latter.

At block S104, the processing unit may store the plurality of the trained CTC models as the guided CTC models 140-1~140-n. Parameters of the guided CTC models 140-1~140-n can be stored in any internal or external storage device or medium.

In the case where the knowledge distillation is not required, after the processing of block S104, the process may end at block S107. One of the guided CTC models 140 or a set of the plurality of the guided CTC models 140-1~140-n and the posterior fusion module 142 is used as the CTC model 170 for the speech recognition.

On the other hand, in the case where the knowledge distillation is conducted, after the processing of block S104, the process may proceed to block S105. At block S105, the processing unit may perform the knowledge distillation, by the knowledge distillation module 150, using the plurality of the guided CTC models 140-1~-140-n as a teacher model to train a student CTC model 160. At block S106, the processing unit may store the trained student CTC model 160. Parameters of the trained student CTC model 160 are stored into any internal or external storage device or medium. Then, the process may end at block S107. The trained student CTC model 160 is used as the CTC model 170 for the speech recognition.

Hereinafter, with reference to FIG. 6, the processing at block S103 in FIG. 5 is described in more detail. The process shown in FIG. 6 may begin at block S200 in response to the processing of block S103 shown in FIG. 5 being called. Note that the process shown in FIG. 6 is a process for obtaining/generating one guided CTC model 140. Thus, the process shown in FIG. 6 is repeated for the required number of the guided CTC models 140.

At block S201, the processing unit may initialize one CTC model using appropriate seeds for random parameter initialization. In a particular embodiment, different seeds can be used for a plurality of CTC models. By using the different seeds, even the CTC models with exactly the same architecture trained with the same procedure can have sufficient diversity to benefit from posterior fusion.

At block S202, the processing unit can read an input training sample of the training data from among the given collection of the training data. Each training data includes a sequence of feature frames each having a vector of acoustic features and a sequence of symbols. The order of the training data can be sorted according to the length of the longest utterance in a certain epoch or epochs (e.g. first epoch). Even though the training data is sorted according to the length, the order of the training data having the same length can be shuffled. The order of the training data can be randomized in a certain epoch or epochs (e.g. remaining epochs).

At block S203, the processing unit can feed a training sample X into the guiding CTC model 130 to generate a sequence of posterior distributions. The sequence of the feature frames of the training data is given as the training sample X.

At block S204, the processing unit can prepare a mask based on the sequence of the posterior distributions obtained from the guiding CTC model 130 by setting a '1' at the output symbol with the highest posterior probability and a '0' at other symbols at each time index. In the cases where the non-spike symbol (the blank symbol φ and, optionally, the silence symbol) has the highest posterior, '0' is set for all symbols at this time index.

At block S205, the processing unit can feed the same training sample X into the CTC model being trained to generate a sequences of posterior distributions.

At block S206, the processing unit can apply the mask generated at block S204 to the output that is obtained from each CTC model being trained for the same training sample X at block S205 to obtain masked posterior distributions.

At block S207, the processing unit can update the parameters of the CTC model being trained so as to minimize the guide loss jointly with the normal CTC loss ($L_G+L_{CTC}$).

At block S208, the processing unit can determine whether a predetermined exit criterion is satisfied or not. The exit criterion can include convergence condition and/or an upper limit for the number of the epochs. If the processing unit determines that the predetermined exit criterion is not satisfied in block 208 (NO), the process can loop back to block S202 for additional training data. In response to the predetermined exit criterion being satisfied in block 208 (YES), the process can end at block S209.

Note that in the described embodiment, the loop from blocks S202-S208 has been described to be performed for each input training sample for the purpose of the description. However, a way of training the guided CTC model 140 is not limited. Batch learning and mini-batch learning are also contemplated.

According to the aforementioned embodiments, one or more models are trained with its spike timing being aligned under guidance of a guiding model. Due to the spike timing alignment, it is possible to successfully realize a system combination for combining multiple CTC models such as the posterior fusion, which could not be leveraged with the normal CTC training. As demonstrated in the experimental results described below, better speech recognition accuracy can be obtained by the system combination. Also, it becomes possible to realize knowledge distillation using multiple CTC models having arbitrary architectures as a teacher model.

Furthermore, as demonstrated in the experimental results described below, even if the guiding model is compact, there is almost no adverse effect on the performance of the guided model for the speech recognition. Hence, by making the guiding model compact, the time of training can be shortened and the consumption of computational cost for training can be reduced.

In a preferable embodiment, the knowledge distillation between models having different architectures such as distillation from bidirectional model to unidirectional model becomes possible. In a particular embodiment, one or more bidirectional models guided by a unidirectional guiding model can serve as a good teacher to train a unidirectional student model.

Note that the languages to which the novel training for speech recognition according to the exemplary embodiments of the invention may be applicable is not limited and such languages may include, but by no means be limited to, Arabic, Chinese, English, French, German, Japanese, Korean, Portuguese, Russian, Swedish, Spanish, for instance. Since the novel training has an alignment-free nature, the GMM/HMM system for the forced alignment, which is required for the conventional alignment-based systems, may be omitted. Also, when a word unit end-to-end model is employed, any dictionary and any language model are not required. Hence, the novel training is suitable for certain languages where the GMM/HMM system and/or dictionary are difficult to prepare.

Furthermore, in the aforementioned embodiments, the novel training has been described to be applied to the speech recognition. However, applications to which the CTC model is applicable are not limited to the speech recognition. The CTC model can be used in various sequence recognition tasks other than the speech recognition. Also, the issue of spike timing would arise not only in the speech recognition but also in other sequence recognition tasks. Such sequence recognition tasks can include handwritten text recognition from images or sequences of pen strokes, optical character recognition, gesture recognition, etc. Thus, the novel guided CTC training is expected to be applied to such other sequence recognition tasks.

Although the advantages obtained with respect to the one or more specific embodiments according to the present invention have been described and will be described below, it should be understood that some embodiments may not have these potential advantages, and these potential advantages are not necessarily required of all embodiments.

Experimental Studies

A program implementing the guided CTC training module 110 shown in FIG. 1 and FIG. 2 and the guided CTC training process described in FIG. 5 and FIG. 6 according to the exemplary embodiment was coded and executed for a given set of speech data. A hard type mask was employed for computing the guide loss. In the cases where the blank symbol φ or the silence symbol has the highest posterior, '0' is set for all symbols at this time index (i). ASR experiments were conducted on both of phone and word CTC models to verify the advantages of the novel guided CTC training. The standard 300-hour Switchboard English conversational telephone speech data was used as training data. All models were trained for 20 epochs using stochastic gradient descent with the Nesterov momentum of 0.9 and a learning rate starting from 0.03 and annealing at 0.5 per-epoch after the 10th epoch. The batch size was set to 128 for phone CTC models and 96 for word CTC models. The multiple models were trained for each experiment to investigate the effect of the posterior fusion. By using different seeds for random parameter initialization, even models with exactly the same architecture trained with the same procedure have sufficient diversity to benefit from posterior fusion. This procedure was followed with the order of the training data also being randomized after the first epoch (SortaGrad).

Experiment 1 (Posterior Fusion of Unidirectional LSTM (UniLSTM) Phone CTC Models)

Experiments on posterior fusion with unidirectional LSTM phone CTC models were conducted. Forty-dimensional logMel filterbank energies, their delta and double-delta coefficients were employed as acoustic features with frame stacking and skipping rate of 2, which results in 240-dimensional features. Forty-four phones from the Switchboard pronunciation lexicon and the blank symbol were used as symbols. For decoding, a 4-gram language model was trained with 24 M words from the Switchboard+Fisher transcripts with a vocabulary size of 30K. A CTC decoding graph similar to the one in literature (Y. Miao, et al, "EESEN: End-to-end speech recognition using deep RNN models and WFST-based decoding," in Proc. ASRU, 2015, pp. 167-174.) was constructed.

For the neural network architecture, six unidirectional LSTM layers with 640 units, a fully-connected linear layer of 640×45 and a softmax activation function were stacked. All neural network parameters were initialized to samples of a uniform distribution over (−e, e), where e is the inverse square root of the input vector size. For evaluation, the Hub5-2000 Switchboard (SWB) and CallHome (CH) test sets were used.

The evaluated results of Examples and Comparative Examples of Experiment 1 are summarized in Table 1.

TABLE 1

|  | Description of models | SWB WER[%] | CH WER[%] |
| --- | --- | --- | --- |
| Comparative Example 1(1A) | UniLSTM | 15.3 | 27.6 |
| Comparative Example 2(1B) | 4 × posterior fusion of 1A | 15.4 | 28.8 |
| Comparative Example 3(1C) | 4 × ROVER of 1A | 14.1 | 26.1 |
| Example 1(1D) | UniLSTM guided by UniLSTM | 14.4 | 26.2 |
| Example 2(1E) | 4 × posterior fusion of 1D | 12.9 | 24.2 |
| Example 3(1F) | 4 × ROVER of 1D | 13.7 | 24.5 |

Four unidirectional LSTM phone CTC models were trained with the standard CTC training. In Comparative Example 1 (1A), the Word Error Rates (WERs) for the four decoding outputs from the four models were averaged. As for Comparative Example 2 (1B), the posterior distributions from the four models were averaged and the averaged posterior was used for decoding with the graph. For comparison, the four decoding outputs from the four models were combined by using the ROVER as Comparative Example 3 (1C).

By comparing Comparative Example 1 (1A) and Comparative Example 2 (1B), it was seen that since the posterior distributions from the four models were not aligned, it is difficult to benefit from posterior fusion. ROVER showed a solid improvement in Comparative Example 3 (1C).

As for Examples 1-3 (1D-1F), a unidirectional LSTM phone CTC model was first trained with the same architecture and training data and then used as the guiding CTC model 130 to obtain/generate four guided CTC models by the novel guided CTC training. Example 1 (1D) indicates the average WERs of the four decoding outputs by the four guided unidirectional LSTM phone CTC models trained by the novel guided CTC training. Comparing Comparative Example 1 (1A) and Example 1 (1D), a WER reduction by the novel guided CTC training was verified. The novel guided training decreased WER of the unidirectional LSTM phone CTC model from 15.3 to 14.4 in a SWB test set. The guide loss promotes a good CTC alignment path and assigns lower probabilities to bad CTC alignment paths on the basis of the guiding model during the CTC training.

Note that a naive alternative is to conduct the standard unidirectional LSTM phone CTC training starting from a pre-trained guiding CTC model. By this approach, the WERs of 15.0% and 27.3% were obtained in SWB and CH test sets. The larger improvements obtained in Example 1 (1D) demonstrate the advantage of the novel guided CTC training.

Examples 2 (1E) and 3 (1F) showed WERs by the posterior fusion and ROVER of the four guided models trained with the novel guided CTC training. Due to the aligned posterior distributions, benefits were successfully obtained from the posterior fusion that outperformed the ROVER. Note that posterior fusion requires decoding with the graph just once, while ROVER needs four separate decodes. This is another advantage of the posterior fusion realized by the novel CTC guided training.

Figure 7A:
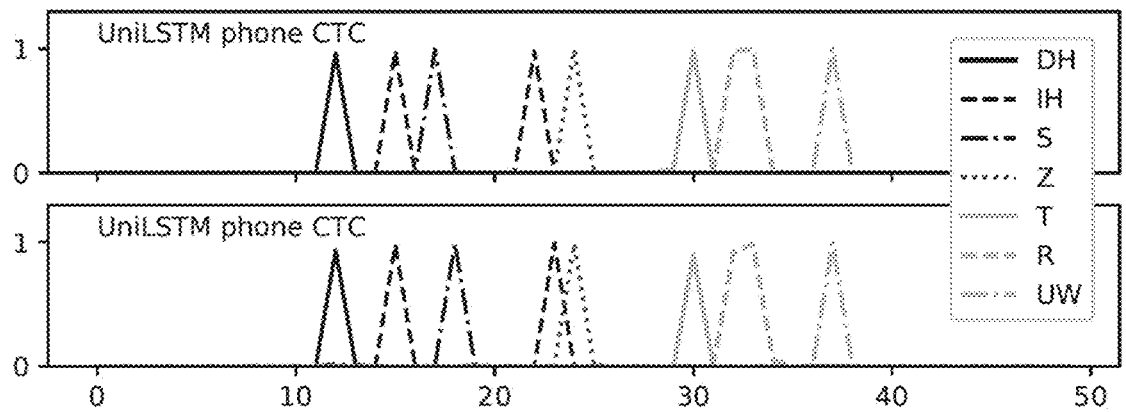
FIG. 7A shows spike timing of two unidirectional LSTM phone CTC models without guidance of the guiding model.

FIG. 7A shows spike timing of two unidirectional LSTM phone CTC models without guidance of the guiding model, which were obtained for the same utterance, "this (DH IH S) is (IH S) true (T RUW)", where symbols in parentheses represent phones. The horizontal axis represents time indices and the vertical axis represents posterior probabilities of corresponding symbols. As expected, phone spike positions were not aligned between the unidirectional LSTM phone CTC models. Hence, the posterior fusion that averages posterior distribution at the same time index from multiple models is not effective.

Figure 7B:
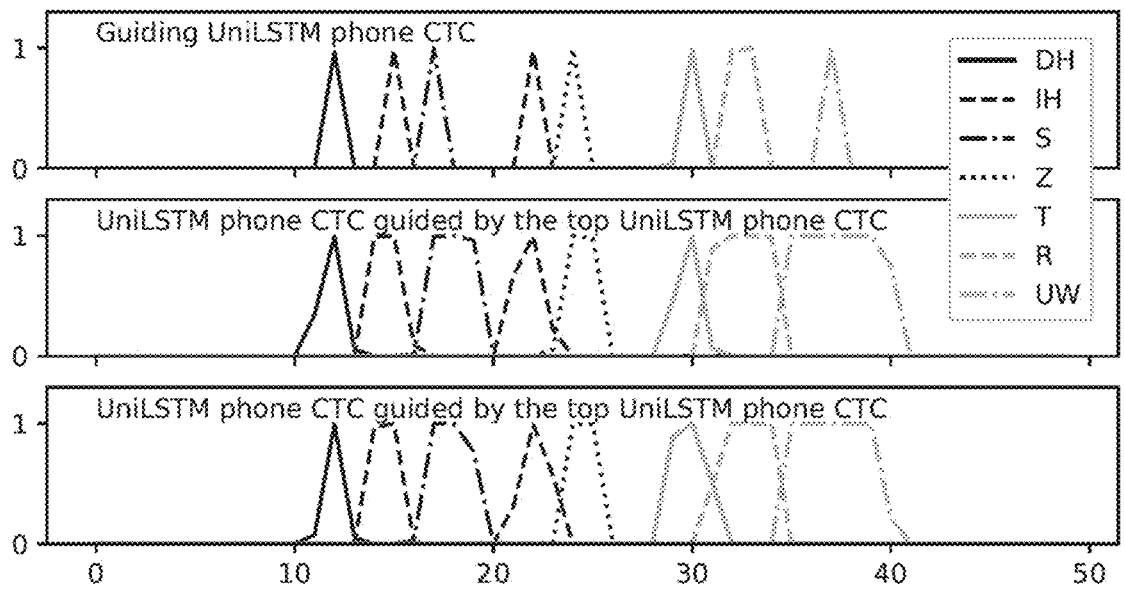
FIG. 7B shows spike timing of guiding and guided unidirectional LSTM phone CTC models.

FIG. 7B shows spike timing of the guiding unidirectional LSTM phone CTC model at the top and the unidirectional LSTM phone CTC models guided by the guiding model with the novel guided CTC training at the middle and the bottom. As shown in FIG. 7B, the spikes from the guided CTC models were temporally smoothed and the spike positions of the guiding models were covered by the smoothed spikes of the guided models. Hence, the spike timings from multiple guided models overlapped, which underpins the improved WERs by the posterior fusion.

Experiment 2 (Knowledge Distillation from Bidirectional LSTM (BiLSTM) Phone CTC to Unidirectional LSTM (UniLSTM) Phone CTC Models)

Next, knowledge distillation from bidirectional LSTM to unidirectional LSTM phone CTC models were explored. The unidirectional LSTM CTC models are more suitable for deployment in actual streaming ASR services and products and closing the ASR accuracy gap between unidirectional LSTM and bidirectional LSTM CTC models is desired.

The same speaker independent (SI) 240-dimensional feature vectors as Experiment 1 was used while keeping the actual use-case of streaming ASR. For the bidirectional LSTM phone CTC models, six bidirectional LSTM layers with 320 units each in the forward and backward layers, a fully-connected linear layer of 640×45 and a softmax activation function were stacked. For the unidirectional LSTM phone CTC models, the same architecture as in Experiment 1 was used. All neural network parameters were initialized in the same fashion as Experiment 1. For evaluation, the same SWB and CH test sets were used.

The evaluated results of Examples and Comparative Examples of Experiment 2 are summarized in Table 2.

TABLE 2

| | Description of models | SWB WER[%] | CH WER[%] |
|---|---|---|---|
| Comparative Example 4(2A) | UniLSTM | 15.3 | 27.6 |
| Comparative Example 5(2B) | BiLSTM | 11.8 | 21.8 |
| Comparative Example 6(2C) | UniLSTM distilled from: | | |
| | 1 × posterior fusion of 2B | 17.1 | 29.9 |
| | 4 × posterior fusion of 2B | 29.4 | 32.7 |
| Example 4(2D) | BiLSTM guided by UniLSTM | 12.4 | 22.6 |
| Example 5(2E) | BiLSTM distilled from: | | |
| | 1 × posterior fusion of 2D | 13.4 | 25.4 |
| | 4 × posterior fusion of 2D | 12.9 | 24.8 |
| | 8 × posterior fusion of 2D | 12.9 | 24.7 |

Figure 8A:
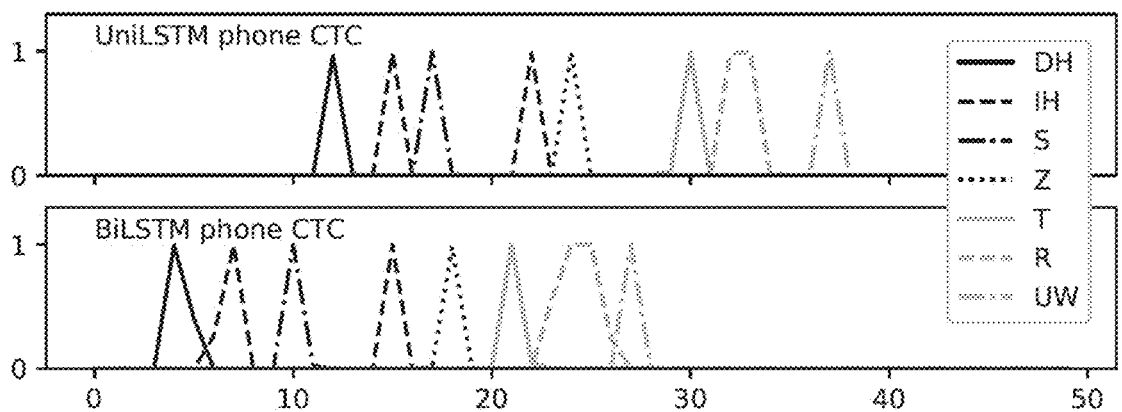
FIG. 8A shows spike timing of unidirectional and bidirectional LSTM phone CTC models without guidance of the guiding model.

Comparative Examples 4 (2A) and 5 (2B) indicate the WERs by the unidirectional LSTM and bidirectional LSTM phone CTC models trained with the standard procedure. As a naive approach, in Comparative Example 6 (2C), a unidirectional LSTM phone CTC model was trained through knowledge distillation from the bidirectional LSTM phone CTC models by minimizing the frame-wise KL divergence. But, degradation in WERs was observed. The spike timings from the bidirectional LSTM were not appropriate for the unidirectional LSTM, as also shown in FIG. 8A, where the spike timings for the same utterance were completely different between the unidirectional LSTM and the bidirectional LSTM phone CTC models. In addition, posterior distributions from the bidirectional LSTM models trained with the standard training were not aligned and thus knowledge distillation from their posterior fusion was not successful.

Figure 8B:
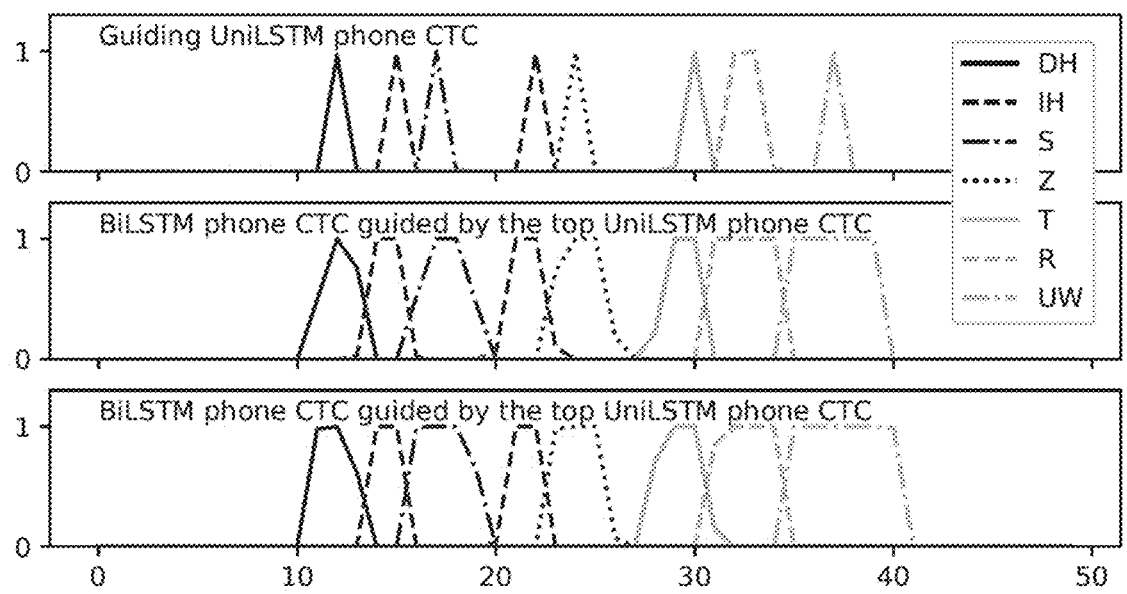
FIG. 8B shows spike timing of a guiding unidirectional LSTM phone CTC model and guided bidirectional LSTM phone CTC models.

Example 4 (2D) is the step where a guiding unidirectional LSTM phone CTC model was first trained and then a bidirectional LSTM model was trained by using the guiding unidirectional LSTM phone CTC model. The trained bidirectional LSTM model had spike timings appropriate for the unidirectional LSTM model as shown in FIG. 8B while posterior distributions were estimated with bidirectional context. In FIG. 8B, the bottom two bidirectional LSTM models guided by the top unidirectional LSTM model have the common spike timings with the top unidirectional LSTM model.

Comparing Comparative Examples 5 (2B) and Example 4 (2D), it can be seen that Example 4 (2D) had a worse WER because the spike positions were unnatural for a bidirectional LSTM phone CTC model. However, this model can serve as an appropriate teacher to train a unidirectional LSTM model. Multiple bidirectional LSTM models were trained and guided by the same guiding unidirectional LSTM model. Then, their posterior fusion was used as a teacher model to train a single student unidirectional LSTM model by the knowledge distillation, where the frame-wise KL divergence from the student model to the fused teacher posterior was minimized.

Example 5(2E) indicates the WERs by the unidirectional LSTM models distilled from the posterior fusion of 1, 4, and 8 bidirectional LSTM models guided by the same guiding unidirectional LSTM model. Note that the posterior fusion of 1 guided model indicates the use of posteriors from one guided model directly. Even in the case of just 1 guided bidirectional LSTM model, the WER for SWB was reduced to 13.4%, which was equivalent to reducing the gap between bidirectional LSTM and unidirectional LSTM models by 54.3%. By increasing the number of bidirectional LSTM models, the WER for SWB was reduced to 12.9%, which equals a 68.6% accuracy gap reduction. As in the bottom two posterior distributions in FIG. 8B, the temporally smoothed spikes of the guided bidirectional LSTM models overlapped around the spikes of the guiding unidirectional LSTM model, which underpins the improved WERs by increasing the number of guided bidirectional LSTM models.

Experiment 3 (Posterior Fusion and Knowledge Distillation of Bidirectional LSTM (BiLSTM) Word CTC Models)

Then, the novel guided CTC training was applied to bidirectional LSTM word CTC models. For input acoustic features, 100-dimensional i-vectors for each speaker extracted in advance were added and appended to the same SI feature used in the previous experiments (Experiments 1 and 2), resulting in 340-dimensional feature vectors. Words with at least 5 occurrences in the training data were selected. This resulted in an output layer with 10,175 words and the blank symbol. Six BiLSTM layers with 512 units each in the forward and backward layers (bidirectional LSTM encoder), 1 fully-connected linear layer with 256 units for reducing computation, 1 fully-connected linear layer of 256×10,176 and a softmax activation function were stacked. For better convergence, the bidirectional LSTM encoder part was initialized with the trained bidirectional LSTM phone CTC model. To initialize multiple word CTC models for posterior fusion and ROVER, multiple phone CTC models were trained with different parameter initialization and training data order. Other parameters were initialized in a similar fashion as the phone CTC models. For decoding, a simple peak-picking was performed over the output word posterior distribution, and repetitions and blank symbols were removed. For evaluation, in addition to SWB and CH, RT02 (6.4 h, 120 speakers, 64K words), RT03 (7.2 h, 144 speakers, 76K words) and RT04 (3.4 h, 72 speakers, 36.7K words) test sets were used.

Figure 9A:
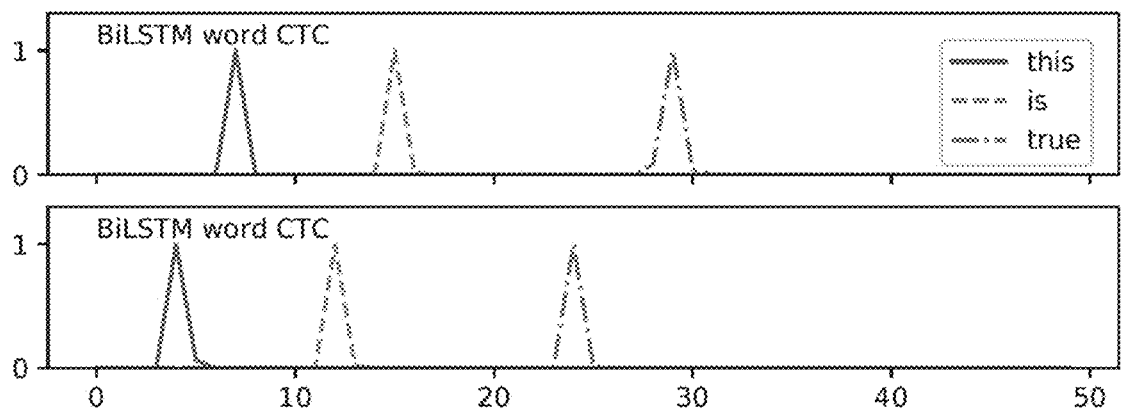
FIG. 9A shows spike timing of bidirectional LSTM word CTC models without guidance of the guiding model.

The evaluated results of Examples and Comparative Examples of Experiment 3 are summarized in Table 3.

from the four models were not aligned and the spikes from word models were much sparser than those from phone models, a significant degradation in accuracy was shown (from 14.9 to 48.2 in SWB test set). Due to the sparse non-aligned word spikes, ROVER also did not improve the ASR accuracy, as in Comparative Example 9 (3C). FIG. 9A shows the word posterior distributions from the bidirectional LSTM word CTC models that were sparse and non-aligned, which caused degradation in Comparative Examples 8 (3B) and 9 (3C).

Figure 9B:
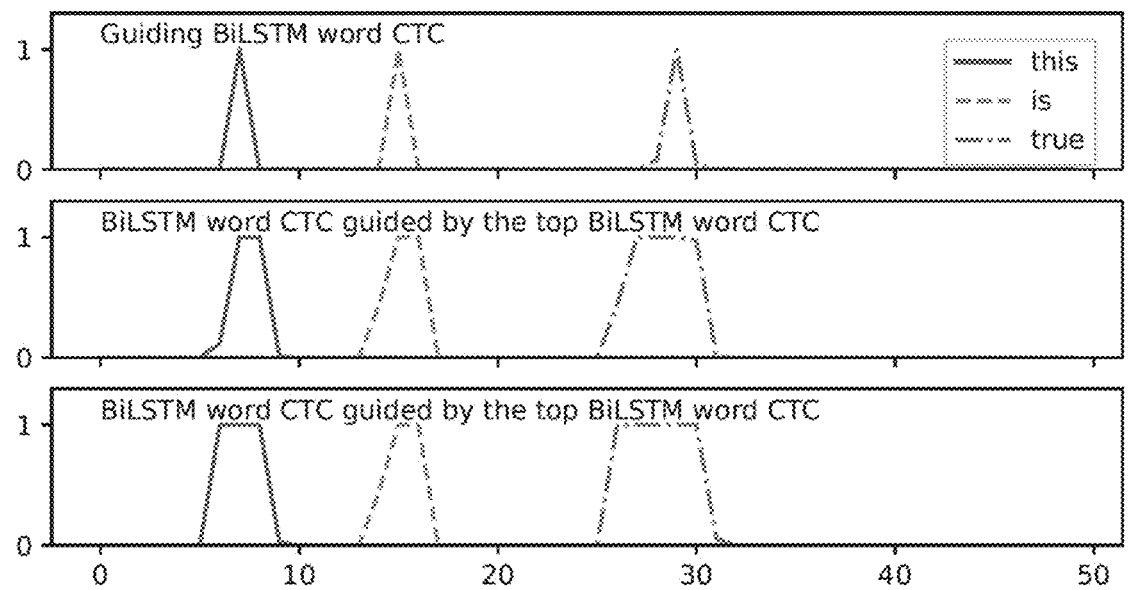
FIG. 9B shows spike timing of a guiding bidirectional LSTM word CTC model and guided bidirectional LSTM word CTC models.

For the novel guided CTC training, a bidirectional LSTM word CTC model was first trained with the same architecture and training data and then used as a guiding model to train four guided models. In FIG. 9B, it was shown that bottom two bidirectional LSTM word CTC model guided by the top bidirectional LSTM word CTC model have the common spike timings with the top bidirectional LSTM word CTC model. Due to the aligned spike timings, posterior fusion and knowledge distillation performed well.

Example 6 (3D) indicates the average WERs of four decoding outputs by the four bidirectional LSTM word CTC models trained by the novel guided CTC training. Comparing Comparative Example 7 (3A) and Example 6 (3D), a WER reduction by the novel guided CTC training was observed, as in the case of the phone CTC models in Experiment 1. The novel guided training decreased WER of the bidirectional LSTM word CTC model from 14.9 to 14.3 in SWB.

Examples 7(3E) and 8 (3F) show WERs by the posterior fusion and ROVER of the four guided models. Due to the aligned posteriors obtained by the guided CTC training, both posterior fusion and ROVER improved ASR accuracy compared with Example 6 (3D) while posterior fusion outperformed ROVER.

Finally, the posterior fusion from the guided bidirectional LSTM models was used as a teacher and a single student bidirectional LSTM word CTC model was trained by knowledge distillation by minimizing the frame-wise KL divergence. Posterior fusion is better than ROVER and can be used as a teacher for knowledge distillation. Note that a

TABLE 3

|  | Description of models | SWB | CH | RT02 | RT03 | RT04 | Avg. |
|---|---|---|---|---|---|---|---|
| Comparative Example 7(3A) | BiLSTM | 14.9 | 24.1 | 23.7 | 24.1 | 22.6 | 21.9 |
| Comparative Example 8 (3B) | 4 × posterior fusion of 3A | 48.2 | 57.7 | 57.7 | 58.9 | 59.3 | 56.4 |
| Comparative Example 9(3C) | 4 × ROVER of 3A | 16.0 | 23.2 | 24.8 | 26.1 | 26.7 | 23.3 |
| Example 6(3D) | BiLSTM guided by BiLSTM | 14.3 | 23.3 | 23.1 | 23.8 | 22.0 | 21.3 |
| Example 7(3E) | 4 × posterior fusion of 3D | 11.7 | 20.2 | 19.2 | 19.7 | 18.5 | 17.9 |
| Example 8(3F) | 4 × ROVER of 3D | 13.0 | 20.6 | 20.9 | 21.2 | 19.9 | 19.1 |
| Example 9(3G) | BiLSTM distilled from 4 × posterior fusion of 3E | 13.7 | 23.1 | 22.4 | 22.9 | 21.7 | 20.8 |

Four bidirectional LSTM word CTC models were trained with the standard training and posterior fusion and ROVER were conducted. Comparative Example 7 (3A) indicates the average WERs of four decoding outputs from the four models. Comparative Example 8 (3B) and Comparative Example 9 (3C) indicate the WERs by posterior fusion and ROVER, respectively. Comparing Comparative Example 7 (3A) and Comparative Example 8 (3B), since the posteriors ROVER result is difficult to use as a teacher for knowledge distillation. Example 9 (3G) shows the results where the WERs were further decreased from Example 6 (3D) consistently over all test sets. By using knowledge distillation with posterior fusion from the four guided bidirectional LSTM word CTC models as a teacher, a single model with state-of-the-art accuracy (13.7 in SWB and 23.1 in CH) was obtained.

A comparison on WERs with the published CTC based direct acoustic-to-word models trained from the standard 300-hour Switchboard data without using any data augmentation or language model are summarized in Table 4.

TABLE 4

|  | Description of models | Alignments | SWB | CH |
|---|---|---|---|---|
| Literature 1 (4A) | WORD CTC | N | 14.6 | 23.6 |
| Literature 2 (4B) | Hierarchical subword CTC | N | 14.0 | 27.1 |
| Literature 3 (4C) | Joint CTC-CE | Y | 13.0 | 23.4 |
| Example 9 (4D) | BiLSTM distilled from 4 × posterior fusion of 3E | N | 13.7 | 23.1 |
| Example 7(4E) | 4 × posterior fusion of 3D | N | 11.7 | 20.2 |

The best single model (Example 9 (4G)) trained by the knowledge distillation outperformed the published CTC models trained in a purely end-to-end fashion in Literature 1 (4A) (K. Audhkhasi, et al., "Building competitive direct acoustics-to-word models for English conversational speech recognition" in Proc. ICASSP, 2018, pp. 4759-4763.) and Literature 2 (4B) (R. Sanabria, et al, "Hierarchical multi task learning with CTC", in Proc. SLT, 2018, pp. 485-490.) By combining CTC and cross-entropy (CE) training using the alignment between the acoustic frame and the labels, as in a conventional non end-to-end system, 13.0% and 23.4% were achieved in Literature 3 (4C) (C. Yu, et al., "A multistage training framework for acoustic-to-word model," in Proc. INTERSPEECH, 2018, pp. 786-790.) The best single model (Example 9 (4D)) achieved the comparable WERs of 13.7% and 23.1% with purely end-to-end training without any frame-level alignments.

Experiment 4 (Effect on Network Size of Guiding CTC Model)

The training of the guiding CTC model increases the training time and incurs extra computational cost when comparing with the standard CTC training. The guiding CTC models having different network sizes were examined. The evaluated results of Examples and Comparative Examples of Experiment 4 are summarized in Table 5.

TABLE 5

|  | Description of models | SWB | CH |
|---|---|---|---|
| Comparative Example 10(5A) | BiLSTM(38M) | 14.9 | 24.1 |
| Example 10 (5B) | BiLSTM (38M) guided by BiLSTM(38M) | 14.3 | 23.3 |
| Example 11 (5C) | 4 × posterior fusion of 5B | 11.7 | 20.2 |
| Example 12 (5D) | BiLSTM (38M) guided by BiLSTM(16M) | 14.3 | 23.0 |
| Example 13 (5E) | 4 × posterior fusion of 5D | 11.9 | 20.0 |

Comparative Example 10 (5A) corresponds to Comparative Example 7 (3A). Example 10 (5B) corresponds to Example 6 (3D). Example 11 (5C) corresponds to Example 7(3E). As for Examples 12 (5D) and 13 (5E), a bidirectional LSTM word CTC model having the network size of 16 M parameters was first trained with the same architecture and training data and then used as a guiding model to train four guided models having the size of 38 M. Example 12 (5D) indicates the average WERs of four decoding outputs by the four bidirectional LSTM word CTC models (38 M) trained under the guidance of the bidirectional LSTM word CTC model (16 M). Example 13 (5D) shows WERs by the posterior fusion of the four guided models. It was confirmed that there are no negative effects even if a smaller network was used.

Experiment 4 (Analysis on Spike Timings)

Looking at the posteriors in FIG. 7A, FIG. 7B, FIG. 8A, FIG. 8B, FIG. 9A and FIG. 9B, it can be seen that spikes from models that were trained with the standard training (that is referred to as non-guided models) were not aligned, while the spikes from the guiding and the guided models and those of the guided models that share the same guiding model were aligned. The coverage ratio was quantitatively analyzed by investigating whether the posterior spikes (except for the blank and silence) from one model were covered by the spikes from the other model at the same time index. The training data and the SWB test data were used for this analysis. The analysis results of Experiment 5 are summarized in Table 6.

TABLE 6

| Description of models | Training Data | Test Data |
|---|---|---|
| UniLSTM phone CTC | | |
| 2 non-guided models | 68.4 | 66.9 |
| guiding and guided models | 91.7 | 89.4 |
| 2 guided models | 88.1 | 86.6 |
| BiLSTM word CTC | | |
| 2 non-guided models | 38.8 | 34.4 |
| guiding and guided models | 92.3 | 85.7 |
| 2 guided models | 88.2 | 82.9 |

Note that in the case of the guiding and guided models, it was investigated whether the spikes from the guiding model were covered by the corresponding guided model or not. For other cases, 2 models trained using the same training procedure while changing the parameter initialization and the training data order were randomly picked.

For both the unidirectional LSTM phone CTC and the bidirectional LSTM word CTC models, the coverage ratio of 2 non-guided models was low. Especially, due to sparse nature of spikes, the coverage ratio of the bidirectional LSTM word CTC was much lower, which underpins the poor WERs by the posterior fusion in Comparative Examples 8 (3B) of Table 3. The coverage ratio between the guiding and guided model was improved and the coverage ratio between 2 guided models was slightly worse, but much higher than the coverage ratio between the 2 non-guided models. Comparing the training and test data, the training data had a slightly higher coverage ratio, but the same trends were seen for all combinations of models, which supports the experimental results.

Summary

It was experimentally demonstrated that the novel guided CTC training shows advantages in various scenarios, including posterior fusion of multiple CTC models and knowledge distillation between CTC models. Through the experiments, state-of-the-art WERs was archived in the CTC-based direct acoustic-to-word setting without using any data augmentation or language model. By qualitatively and quantitatively investigating the posterior spike timings from the CTC models trained with the novel guided CTC training, it was confirmed that the spike timings were aligned between the guiding and the guided models and between the multiple guided models.

Computer Hardware Component

Figure 10:
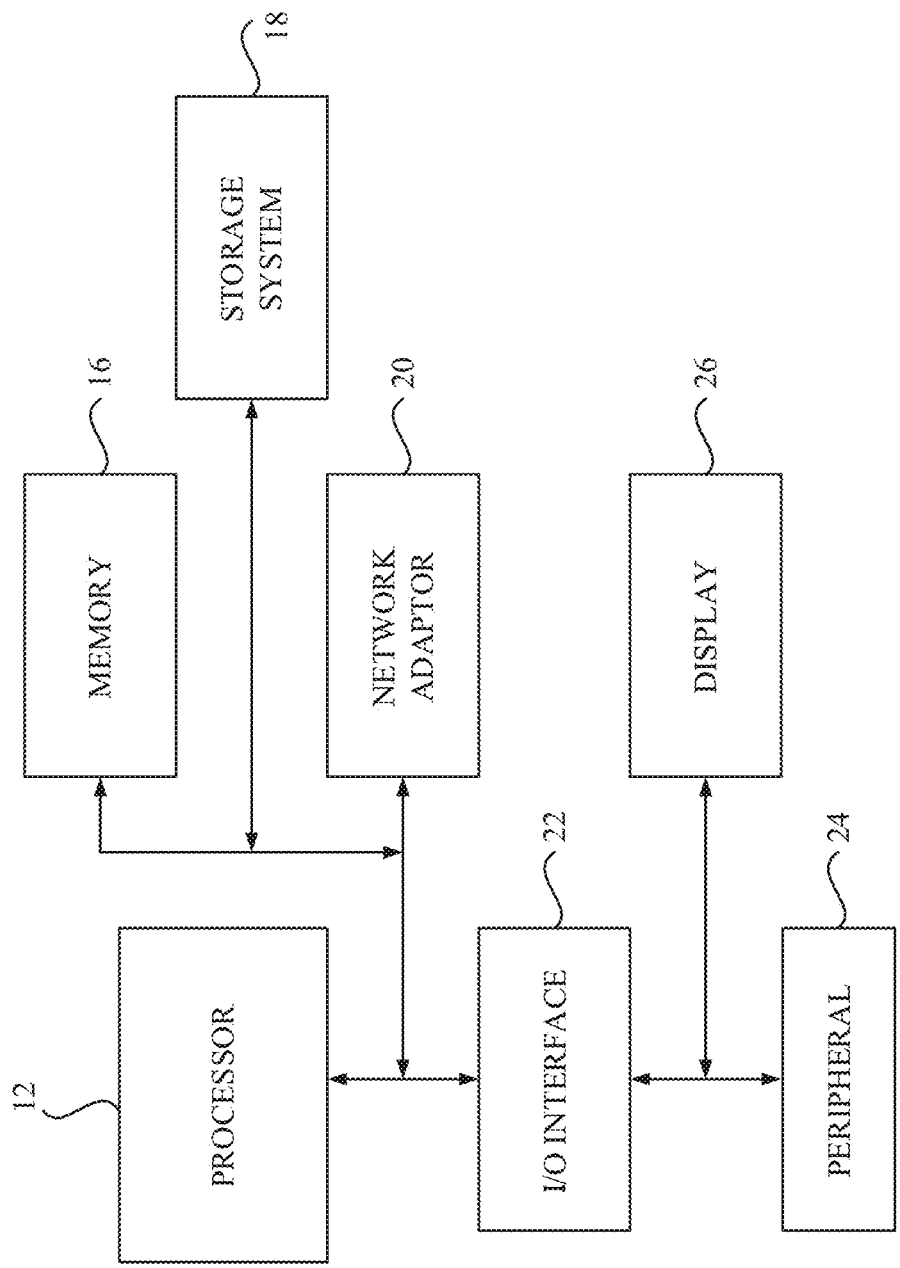
FIG. 10 depicts a schematic of a computer system according to one or more embodiments of the present invention.

Referring now to FIG. 10, a schematic of an example of a computer system 10, which can be used for the speech recognition system 100, is shown. The computer system 10 shown in FIG. 10 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, hand-held or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 10, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random-access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

A program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

As employed herein, the term "hardware processor subsystem", "processing unit", or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for aligning spike timing of models, comprising:
    generating a first model having a first architecture trained with a set of training samples each including an input sequence of observations and an output sequence of symbols having different length from the input sequence;
    training one or more second models with the trained first model by minimizing a guide loss and maximizing a negative of the guide loss jointly with a normal loss for each second model, the guide loss evaluating dissimilarity in spike timing between the trained first model and each second model being trained, the minimizing the guide loss jointly with the normal loss for each second model configured to force spikes of the one or more second models to occur at a same timing with spikes from the first model; and
    performing a sequence recognition task using the one or more second models.

2. The method of claim 1, wherein at least one of the one or more second models trained with the first model is used for posterior fusion.

3. The method of claim 1, wherein at least one of the one or more second models trained with the first model is used for ROVER (Recognizer Output Voting Error Reduction).

4. The method of of claim 1, wherein each second model constitutes an end-to-end speech recognition model, each observation in the input sequence of the training sample represents an acoustic feature, and each symbol in the output sequence of the training sample represents at least one of a phone, a context dependent phone, a character, a word-piece, and a word.

5. The method of claim 1, wherein the first model and. the second model are alignment-free models.

6. The method of claim 1, wherein the normal loss is CTC (Connectionist Temporal Classification) loss, the first model and the second model are CTC models and the guide loss evaluates the dissimilarity in the spike timing while ignoring at least blank symbols.

7. The method of claim 1, wherein the training of the one or more second models comprises:
    preparing a mask using posterior distributions obtained from the trained first model by feeding an input sample thereto; and
    applying the mask to outputs obtained for the input sample from each second model being trained to obtain masked posterior distributions, the masked posterior distributions at least partially determining the guide loss.

8. The method of claim 7, wherein the mask is configured to pass at least an output value corresponding to a spike emitted from the trained first model at each time index, the spike representing an output symbol other than at least a blank symbol.

9. The method of of claim 7, wherein the mask has a value representing whether to pass or not pass an output value for each output symbol and each time index in a manner depending on a corresponding posterior distribution for each time index in the posterior distributions.

10. The method of claim 7, wherein the mask has a factor representing degree of passing an output value for each output symbol and each time index in a manner depending on a corresponding probability in the posterior distributions.

11. The method of claim 1, wherein at least one of the one or more second models trained with the first model is used as a teacher model for knowledge distillation to train a student model, the student model having an architecture matched to the first architecture of the first model.

12. The method of claim 11, wherein each second model has a second architecture that is different from the first architecture.

13. The method of claim 12, wherein the first architecture is a unidirectional and the second architecture is a bidirectional.

14. A computer system for aligning spike timing of models, by executing program instructions, the computer system comprising:
    a memory storing the program instructions;
    a processing circuitry in communications with the memory for executing the program instructions, wherein the processing circuitry is configured to:
        generate a first model having a first architecture trained with a set of training samples, wherein each training sample includes an input sequence of observations and an output sequence of symbols having different length from the input sequence;
        train one or more second models with the trained first model by minimizing a guide loss and maximizing a negative of the guide loss jointly with a normal loss for each second model, wherein the guide loss evaluates dissimilarity in spike timing between the trained first model and each second model being trained, the minimizing the guide loss jointly with the normal loss for each second model configured to force spikes of the one or more second models to occur at a same timing with spikes from the first model; and
        perform a sequence recognition task using the one or more second models.

15. The computer system of claim 14, wherein at least one of the one or more second models trained with the first model is used for at least one of a model for posterior fusion and a teacher model for knowledge distillation to train a student model, wherein the student model has an architecture matched to the first architecture of the first model.

16. The computer system of claim 14, wherein the processing circuitry is configured to:
    prepare a mask using posterior distributions obtained from the trained first model by feeding an input sample thereto; and
    apply the mask to outputs obtained for the input sample from each second model being trained to obtain masked posterior distributions, wherein the masked posterior distributions at least partially determine the guide loss.

17. The computer system of claim 16, wherein the mask is configured to pass at least an output value corresponding to a spike emitted from the trained first model at each time index, the spike representing an output symbol other than a blank symbol.

18. A computer program product for aligning spike timing of models, the computer program product comprising a processor device operably connected to a non-transitory computer readable storage medium having program instructions embodied therewith, the program instructions executable by a computer to cause the computer to perform a method comprising:

generating a first model having a first architecture trained with a set of training samples each including an input sequence of observations and an output sequence of symbols having different length from the input sequence;

training one or more second models with the trained first model by minimizing a guide loss and maximizing a negative of the guide loss jointly with a normal loss for each second model, the guide loss evaluating dissimilarity in spike timing between the trained first model and each second model being trained, the minimizing the guide loss jointly with the normal loss for each second model configured to force spikes of the one or more second models to occur at a same timing with spikes from the first model; and performing a sequence recognition task using the one or more second models.

19. The computer program product of claim 18, wherein the training of the one or more second models comprises:

preparing a mask using posterior distributions obtained from the trained first model by feeding an input sample thereto; and applying the mask to outputs obtained for the input sample from each second model being trained to obtain masked posterior distributions, the masked posterior distributions at least partially determining the guide loss.

20. The computer program product of claim 18, wherein at least one of the one or more second models trained with the first model is used a model for posterior fusion and a teacher model for knowledge distillation to train a student model, the student model having an architecture matched to the first architecture of the first model.

* * * * *